United States Patent
He et al.

(10) Patent No.: US 11,515,540 B2
(45) Date of Patent: Nov. 29, 2022

(54) ALKALI METAL-SELENIUM SECONDARY BATTERY CONTAINING A GRAPHENE FOAM-PROTECTED SELENIUM CATHODE

(71) Applicant: Nanotek Instruments, Inc., Dayton, OH (US)

(72) Inventors: Hui He, Dayton, OH (US); Aruna Zhamu, Springboro, OH (US); Bor Z. Jang, Centerville, OH (US)

(73) Assignee: Global Graphene Group, Inc., Dayton, OH (US)

( * ) Notice: Subject to any disclaimer, the term of this patent is extended or adjusted under 35 U.S.C. 154(b) by 225 days.

(21) Appl. No.: 15/948,367

(22) Filed: Apr. 9, 2018

(65) Prior Publication Data

US 2019/0312283 A1    Oct. 10, 2019

(51) Int. Cl.
*H01M 4/80* (2006.01)
*H01M 4/38* (2006.01)
(Continued)

(52) U.S. Cl.
CPC .......... *H01M 4/808* (2013.01); *C01B 32/182* (2017.08); *C01B 32/192* (2017.08); *H01M 4/134* (2013.01);
(Continued)

(58) Field of Classification Search
None
See application file for complete search history.

(56) References Cited

U.S. PATENT DOCUMENTS

| 10,193,139 B1* | 1/2019 | El-Kady | H01G 11/68 |
| 2015/0064575 A1* | 3/2015 | He | H01M 10/052 429/300 |

(Continued)

FOREIGN PATENT DOCUMENTS

| CN | 107394176 B | 7/2020 |
| WO | 2017139078 A1 | 8/2017 |

OTHER PUBLICATIONS

An et al., "Diameter-Selected Synthesis of Single Crystalline Trigonal Selenium Nanowires" Materials Chemistry and Physics (2007) vol. 101, No. 2-3, pp. 357-361.
(Continued)

*Primary Examiner* — Robert S Carrico

(57) ABSTRACT

A graphene foam-protected selenium cathode layer for an alkali metal-selenium cell, comprising: (a) a sheet or a roll of solid graphene foam composed of multiple pores and pore walls containing graphene sheets, wherein the graphene sheets contain a pristine graphene material having less than 0.01% by weight of non-carbon elements or a non-pristine graphene material having 0.01% to 20% by weight of non-carbon elements, wherein said non-pristine graphene is selected from graphene oxide, reduced graphene oxide, graphene fluoride, graphene chloride, graphene bromide, graphene iodide, hydrogenated graphene, nitrogenated graphene, boron-doped graphene, nitrogen-doped graphene, chemically functionalized graphene, or a combination thereof, wherein the graphene sheets are interconnected or chemically merged together without an adhesive resin; and (b) selenium coating or particles residing in the pores or bonded to the pore walls of the solid graphene foam.

23 Claims, 14 Drawing Sheets

(51) Int. Cl.
| | |
|---|---|
| H01M 4/66 | (2006.01) |
| H01M 4/78 | (2006.01) |
| H01M 10/0525 | (2010.01) |
| H01M 10/0568 | (2010.01) |
| H01M 10/0569 | (2010.01) |
| H01M 10/054 | (2010.01) |
| C01B 32/182 | (2017.01) |
| C01B 32/192 | (2017.01) |
| H01M 4/134 | (2010.01) |
| H01M 4/62 | (2006.01) |
| H01M 4/02 | (2006.01) |

(52) U.S. Cl.
CPC .............. *H01M 4/38* (2013.01); *H01M 4/625* (2013.01); *H01M 4/663* (2013.01); *H01M 4/78* (2013.01); *H01M 10/054* (2013.01); *H01M 10/0525* (2013.01); *H01M 10/0568* (2013.01); *H01M 10/0569* (2013.01); *H01M 2004/028* (2013.01); *H01M 2300/0028* (2013.01)

(56) References Cited

U.S. PATENT DOCUMENTS

| | | | |
|---|---|---|---|
| 2015/0259212 A1 | 9/2015 | Li et al. | |
| 2016/0019995 A1* | 1/2016 | Zhamu | H01B 1/04 428/219 |
| 2016/0043384 A1 | 2/2016 | Zhamu et al. | |
| 2016/0104882 A1* | 4/2016 | Yushin | H01M 4/362 429/218.1 |
| 2016/0240841 A1 | 8/2016 | He et al. | |
| 2016/0301078 A1* | 10/2016 | Zhamu | H01M 10/0569 |
| 2017/0352868 A1* | 12/2017 | Zhamu | C01B 32/184 |
| 2017/0352869 A1* | 12/2017 | Zhamu | H01M 4/1393 |
| 2018/0108909 A1* | 4/2018 | Su | H01M 4/502 |
| 2018/0277853 A1* | 9/2018 | Mitlin | H01M 4/485 |

OTHER PUBLICATIONS

An et al., "Large-Scale Synthesis of High Quality Trigonal Selenium Nanowires" European Journal of Inorganic Chemistry (2003) vol. 17, pp. 3250-3255.

Chen et al., "Selenium nanowires and nanotubes synthesized via a facile template-free solution method" Materials Research Bulletin (2010) vol. 45, pp. 699-704.

Diwivedi et al., "An Organic Acid-induced Synthesis and Characterization of Selenium Nanoparticles" Journal of Nanotechnology (2011) Article ID 651971, 6 pages.

Fan et al., "Hollow selenium encapsulated into 3D graphene hydrogels for lithium-selenium batteries with high rate performance and cycling stability" RSC Adv. (2017) vol. 7, pp. 21281-21286.

Gao et al., "Hollow Sphere Selenium Nanoparticles: Their In-Vitro Anti Hydroxyl Radical Effect" Advanced Materials (2002), vol. 14, No. 4, pp. 290-293.

Karlicky et al., "Halogenated Graphenes: Rapidly Growing Family of Graphene Derivatives" ACS Nano (2013) vol. 7, No. 8, pp. 6434-6464.

Li et al., "Mixed Surfactant Template Method for Preparation of Nanometer Selenium" E-Journal of Chemistry (2009) vol. 6, No. S1, pp. S304-S310.

Lin et al., "Observation in the Growth of Selenium Nanoparticles" Journal of Chinese Chemical Society (2004) vol. 51, No. 2, pp. 239-242.

Luesakul et al., "Shape-controlled synthesis of cubic-like selenium nanoparticles via the self-assembly method" Carbohydrate Polymers (2016) vol. 153, pp. 435-444.

Zeng et al., "Solvothermal synthesis of trigonal selenium with butterfly-like microstructure" Particuology (2013) vol. 11, No. 5, pp. 614-617.

Zhang et al., "Synthesis of selenium nanoparticles in the presence of polysaccharides" Materials Letters (2004) vol. 58, No. 21, pp. 2590-2594.

PCT/US19/26519 International Search Report and Written Opinion dated Jul. 24, 2019, 14 pages.

U.S. Appl. No. 15/948,343 Final Office Action dated Aug. 25, 2020, 11 pages.

U.S. Appl. No. 15/948,343 Final Office Action dated Nov. 5, 2019, 10 pages.

U.S. Appl. No. 15/948,343 Nonfinal Office Action dated Apr. 23, 2021, 13 pages.

U.S. Appl. No. 15/948,343 Nonfinal Office Action dated Jun. 13, 2019, 10 pages.

U.S. Appl. No. 15/948,343 Nonfinal Office Action dated May 11, 2020, 10 pages.

* cited by examiner

ALKALI METAL-SELENIUM SECONDARY BATTERY CONTAINING A GRAPHENE FOAM-PROTECTED SELENIUM CATHODE

FIELD OF THE INVENTION

The present invention is related to a unique cathode composition and structure in a secondary or rechargeable alkali metal-selenium battery, including the lithium-selenium battery, sodium-selenium battery, and potassium-selenium battery, and a process for producing same.

BACKGROUND

Rechargeable lithium-ion (Li-ion) and lithium metal batteries (including Li-sulfur and Li metal-air batteries) are considered promising power sources for electric vehicle (EV), hybrid electric vehicle (HEV), and portable electronic devices, such as lap-top computers and mobile phones. Lithium as a metal element has the highest capacity (3,861 mAh/g) compared to any other metal or metal-intercalated compound as an anode active material (except $Li_{4.4}Si$, which has a specific capacity of 4,200 mAh/g). Hence, in general, Li metal batteries have a significantly higher energy density than lithium ion batteries.

Historically, rechargeable lithium metal batteries were produced using non-lithiated compounds having relatively high specific capacities, such as $TiS_2$, $MoS_2$, $MnO_2$, $CoO_2$, and $V_2O_5$, as the cathode active materials, which were coupled with a lithium metal anode. When the battery was discharged, lithium ions were transferred from the lithium metal anode through the electrolyte to the cathode, and the cathode became lithiated. Unfortunately, upon repeated charges/discharges, the lithium metal resulted in the formation of dendrites at the anode that ultimately grew to penetrate through the separator, causing internal shorting and explosion. As a result of a series of accidents associated with this problem, the production of these types of secondary batteries was stopped in the early 1990's, giving ways to lithium-ion batteries.

In lithium-ion batteries, pure lithium metal sheet or film was replaced by carbonaceous materials as the anode. The carbonaceous material absorbs lithium (through intercalation of lithium ions or atoms between graphene planes, for instance) and desorbs lithium ions during the re-charge and discharge phases, respectively, of the lithium ion battery operation. The carbonaceous material may comprise primarily graphite that can be intercalated with lithium and the resulting graphite intercalation compound may be expressed as $Li_xC_6$, where x is typically less than 1.

Although lithium-ion (Li-ion) batteries are promising energy storage devices for electric drive vehicles, state-of-the-art Li-ion batteries have yet to meet the cost and performance targets. Li-ion cells typically use a lithium transition-metal oxide or phosphate as a positive electrode (cathode) that de/re-intercalates $Li^+$ at a high potential with respect to the carbon negative electrode (anode). The specific capacity of lithium transition-metal oxide or phosphate based cathode active material is typically in the range from 140-180 mAh/g. As a result, the specific energy of commercially available Li-ion cells is typically in the range from 120-240 Wh/kg, most. These specific energy values are two to three times lower than what would be required for battery-powered electric vehicles to be widely accepted.

With the rapid development of hybrid (HEV), plug-in hybrid electric vehicles (HEV), and all-battery electric vehicles (EV), there is an urgent need for anode and cathode materials that provide a rechargeable battery with a significantly higher specific energy, higher energy density, higher rate capability, long cycle life, and safety. Two of the most promising energy storage devices are the lithium-sulfur (Li—S) cell and lithium-selenium (Li—Se) cell since the theoretical capacity of Li is 3,861 mAh/g, that of S is 1,675 mAh/g, and that of Se is 675 mAh/g. Compared with conventional intercalation-based Li-ion batteries, Li—S and Li—Se cells have the opportunity to provide a significantly higher energy density (a product of capacity and voltage). With a significantly higher electronic conductivity, Se is a more effective cathode active material and, as such, Li—Se potentially can exhibit a higher rate capability.

However, Li—Se cell is plagued with several major technical problems that have hindered its widespread commercialization:

(1) All prior art Li—Se cells have dendrite formation and related internal shorting issues;

(2) The cell tends to exhibit significant capacity decay during discharge-charge cycling. This is mainly due to the high solubility of selenium and lithium poly selenide anions formed as reaction intermediates during both discharge and charge processes in the polar organic solvents used in electrolytes. During cycling, the anions can migrate through the separator to the Li negative electrode whereupon they are reduced to solid precipitates, causing active mass loss. In addition, the solid product that precipitates on the surface of the positive electrode during discharge becomes electrochemically irreversible, which also contributes to active mass loss. This phenomenon is commonly referred to as the Shuttle Effect. This process leads to several problems: high self-discharge rates, loss of cathode capacity, corrosion of current collectors and electrical leads leading to loss of electrical contact to active cell components, fouling of the anode surface giving rise to malfunction of the anode, and clogging of the pores in the cell membrane separator which leads to loss of ion transport and large increases in internal resistance in the cell.

(3) Presumably, nanostructured mesoporous carbon materials could be used to hold the Se or lithium polyselenide in their pores, preventing large out-flux of these species from the porous carbon structure through the electrolyte into the anode. However, the fabrication of the proposed highly ordered mesoporous carbon structure requires a tedious and expensive template-assisted process. It is also challenging to load a large proportion of selenium into the mesoscaled pores of these materials using a physical vapor deposition or solution precipitation process. Typically the maximum loading of Se in these porous carbon structures is less than 50% by weight (i.e., the amount of active material is less than 50%; more than 50% being inactive materials).

Despite the various approaches proposed for the fabrication of high energy density Li—Se cells, there remains a need for cathode materials, production processes, and cell operation methods that retard the out-diffusion of Se or lithium polyselenide from the cathode compartments into other components in these cells, improve the utilization of electro-active cathode materials (Se utilization efficiency), and provide rechargeable Li—Se cells with high capacities over a large number of cycles.

Most significantly, lithium metal (including pure lithium, lithium alloys of high lithium content with other metal elements, or lithium-containing compounds with a high lithium content; e.g. >80% or preferably >90% by weight Li) still provides the highest anode specific capacity as compared to essentially all other anode active materials (except pure silicon, but silicon has pulverization issues). Lithium metal would be an ideal anode material in a lithium-selenium secondary battery if dendrite related issues could be addressed.

Sodium metal (Na) and potassium metal (K) have similar chemical characteristics to Li and the selenium cathode in sodium-selenium cells (Na—Se batteries) or potassium-selenium cells (K—Se) face the same issues observed in Li—S batteries, such as: (i) low active material utilization rate, (ii) poor cycle life, and (iii) low Coulumbic efficiency. Again, these drawbacks arise mainly from insulating nature of Se, dissolution of polyselenide intermediates in liquid electrolytes (and related Shuttle effect), and large volume change during charge/discharge.

Hence, an object of the present invention is to provide a rechargeable Li—Se battery that exhibits an exceptionally high specific energy or high energy density. One particular technical goal of the present invention is to provide a Li metal-selenium or Li ion-selenium cell with a cell specific energy greater than 300 Wh/kg, preferably greater than 350 Wh/kg, and more preferably greater than 400 Wh/kg (all based on the total cell weight).

It may be noted that in most of the open literature reports (scientific papers) and patent documents, scientists or inventors choose to express the cathode specific capacity based on the selenium or lithium polyselenide weight alone (not the total cathode composite weight), but unfortunately a large proportion of non-active materials (those not capable of storing lithium, such as conductive additive and binder) is typically used in their Li—Se cells. For practical use purposes, it is more meaningful to use the cathode composite weight-based capacity value.

A specific object of the present invention is to provide a rechargeable lithium-selenium cell based on rational materials and battery designs that overcome or significantly reduce the following issues commonly associated with conventional Li—Se cells: (a) dendrite formation (internal shorting); (b) low electric and ionic conductivities of selenium, requiring large proportion (typically 30-55%) of non-active conductive fillers and having significant proportion of non-accessible or non-reachable selenium or lithium polyselenide; (c) dissolution of lithium polyselenide in electrolyte and migration of dissolved lithium polyselenide from the cathode to the anode (which irreversibly react with lithium at the anode), resulting in active material loss and capacity decay (the shuttle effect); and (d) short cycle life.

In addition to overcoming the aforementioned problems, another object of the present invention is to provide a simple, cost-effective, and easy-to-implement approach to preventing potential Li metal dendrite-induced internal short circuit and thermal runaway problems in Li metal-selenide batteries.

SUMMARY OF THE INVENTION

The present invention provides a graphene foam-protected selenium cathode layer for an alkali metal-selenium cell, comprising: (a) a sheet or a roll of solid graphene foam composed of multiple pores (cells) and pore walls containing graphene sheets, wherein the graphene sheets contain a pristine graphene material having less than 0.01% by weight of non-carbon elements or a non-pristine graphene material having 0.01% to 20% by weight of non-carbon elements, wherein the non-pristine graphene is selected from graphene oxide, reduced graphene oxide, graphene fluoride, graphene chloride, graphene bromide, graphene iodide, hydrogenated graphene, nitrogenated graphene, boron-doped graphene, nitrogen-doped graphene, chemically functionalized graphene, or a combination thereof, wherein the graphene sheets are interconnected or chemically merged together without an adhesive resin; and (b) selenium coating or particles residing in the pores or bonded to the pore walls of the solid foam.

The solid graphene foam may contain a three-dimensional network of interconnected and ordered open cells. The solid graphene foam, when measured without the metal, has a density ranging from about 0.001 g/cm$^3$ to about 1.7 g/cm$^3$, more preferably and typically from about 0.01 g/cm$^3$ to about 1.5 g/cm$^3$, and most preferably from about 0.01 g/cm$^3$ to about 0.8 g/cm$^3$.

The selenium preferably occupies a weight fraction of 40%-95% based on the total weight of the solid graphene foam and selenium combined. The selenium coating or particles preferably have a thickness of diameter from 0.5 nm to 100 nm (more preferably from 1 nm to 10 nm). The solid graphene foam may further accommodate a second element selected from Sn, Sb, Bi, S, Te, or a combination thereof and the weight of the second element is less than the weight of selenium. The second element may be mixed with selenium (Se) to form a mixture or alloy. The second element, the mixture, or the alloy may be preferably in a nanoparticle or nanocoating form having a diameter or thickness from 0.5 nm to 100 nm. The second element resides in the pores or bonded to pore walls of the solid graphene foam.

In certain embodiments, the solid graphene foam in the graphene foam-protected Se cathode layer can optionally further contain a carbon or graphite filler selected from a carbon or graphite fiber, carbon or graphite nanofiber, carbon nanotube, carbon nanorod, mesophase carbon particle, mesocarbon microbead, expanded graphite flake, needle coke, carbon black or acetylene black, activated carbon, or a combination thereof.

In certain embodiments, the chemically functionalized graphene sheets contain a functional group attached thereto to make the graphene sheets in a liquid medium exhibit a negative Zeta potential from −55 mV to −0.1 mV. In certain embodiments, the chemically functionalized graphene sheets do not include graphene oxide (reduced or un-reduced graphene oxide).

The chemically functionalized graphene sheets may have a chemical functional group selected from alkyl or aryl silane, alkyl or aralkyl group, hydroxyl group, carboxyl group, carboxylic group, amine group, sulfonate group (—SO$_3$H), aldehydic group, quinoidal, fluorocarbon, or a combination thereof.

In certain embodiments, the chemically functionalized graphene comprises graphene sheets having a chemical functional group selected from a derivative of an azide compound selected from the group consisting of 2-azido-ethanol, 3-azidopropan-1-amine, 4-(2-azidoethoxy)-4-oxobutanoic acid, 2-azidoethyl-2-bromo-2-methylpropanoate, chlorocarbonate, azidocarbonate, dichlorocarbene, carbene, aryne, nitrene, (R-)-oxycarbonyl nitrenes, where R=any one of the following groups,

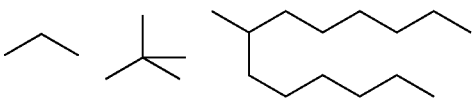

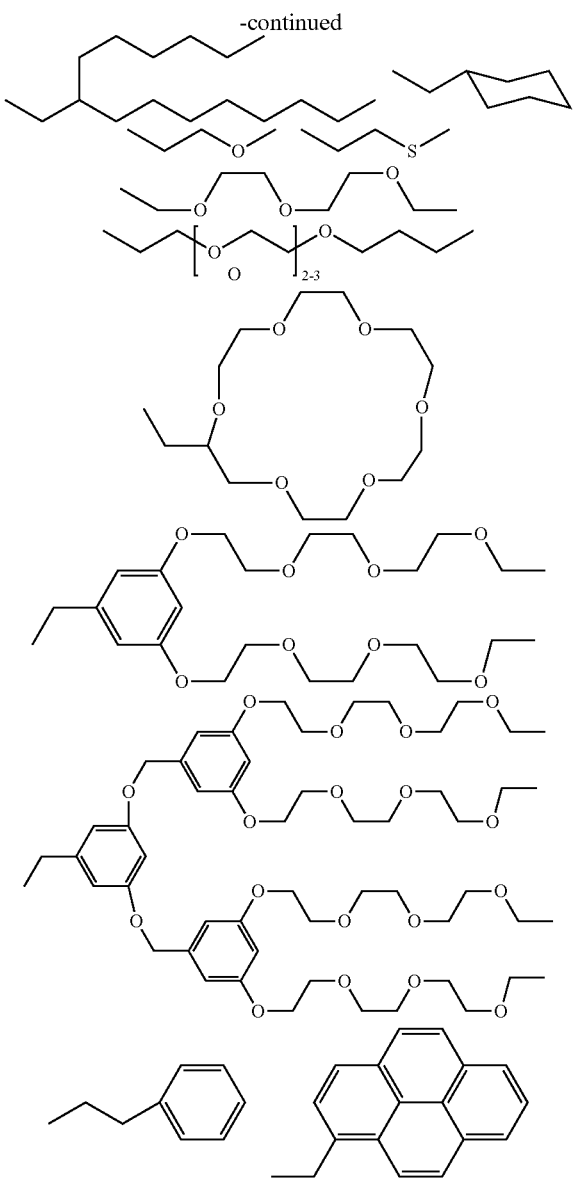

and combinations thereof.

In certain embodiments, the chemically functionalized graphene comprises graphene sheets having a chemical functional group selected from an oxygenated group selected from the group consisting of hydroxyl, peroxide, ether, keto, and aldehyde.

In some preferred embodiments, the chemically functionalized graphene comprises graphene sheets having a chemical functional group selected from the group consisting of —$SO_3H$, —COOH, —$NH_2$, —OH, —R'CHOH, —CHO, —CN, —COCl, halide, —COSH, —SH, —COOR', —SR', —SiR'$_3$, —Si(—OR'—)$_y$R'$_{3-y}$, —Si(—O—SiR'$_2$—)OR', —R", Li, AlR'$_2$, Hg—X, TlZ$_2$ and Mg—X; wherein y is an integer equal to or less than 3, R' is hydrogen, alkyl, aryl, cycloalkyl, or aralkyl, cycloaryl, or poly(alkylether), R" is fluoroalkyl, fluoroaryl, fluorocycloalkyl, fluoroaralkyl or cycloaryl, X is halide, and Z is carboxylate or trifluoroacetate, and combinations thereof.

In some embodiments, the chemically functionalized graphene comprises graphene sheets having a chemical functional group selected from the group consisting of amido-amines, polyamides, aliphatic amines, modified aliphatic amines, cycloaliphatic amines, aromatic amines, anhydrides, ketimines, diethylenetriamine (DETA), triethylene-tetramine (TETA), tetraethylene-pentamine (TEPA), polyethylene polyamine, polyamine epoxy adduct, phenolic hardener, non-brominated curing agent, non-amine curatives, and combinations thereof.

The chemically functionalized graphene may comprise graphene sheets having a chemical functional group selected from OY, NHY, O=C—OY, P=C—NR'Y, O=C—SY, O=C—Y, —CR'1-OY, N'Y or C'Y, and Y is a functional group of a protein, a peptide, an amino acid, an enzyme, an antibody, a nucleotide, an oligonucleotide, an antigen, or an enzyme substrate, enzyme inhibitor or the transition state analog of an enzyme substrate or is selected from R'—OH, R'—NR'$_2$, R'SH, R'CHO, R'CN, R'X, R'N$^+$(R')$_3$X$^-$, R'SiR'$_3$, R'Si(—OR'—)$_y$R$_{3-y}$, R'Si(—O—SiR'$_2$—)OR', R'—R", R'—N—CO, ($C_2H_4O$—)$_w$H, (—$C_3H_6O$—)$_w$H, (—$C_2H_4O$)$_w$—R', ($C_3H_6O$)$_w$—R', R', and w is an integer greater than one and less than 200.

The invention also provides an alkali metal-selenium battery containing an anode, a cathode, an electrolyte in ionic contact with the cathode and the anode, wherein the cathode comprises the aforementioned graphene foam-protected selenium cathode layer herein invented.

In this alkali metal-selenium battery, the solid graphene foam not only protects the cathode active material (i.e. Se alone or Se with a second element, such as S, Sn, Te, Bi, etc.) but also serves as a cathode current collector and there is no additional separate cathode current collector.

In certain embodiments, the invented alkali metal-selenium battery further comprises an anode current collector and/or an additional separate cathode current collector. The alkali metal-selenium battery may be selected from a rechargeable lithium-selenium cell, sodium-selenium cell, potassium-selenium cell, lithium ion-selenium cell, sodium ion-selenium cell, or potassium ion-selenium cell.

In the invented alkali metal-selenium battery, the electrolyte may be selected from polymer electrolyte, polymer gel electrolyte, composite electrolyte, ionic liquid electrolyte, non-aqueous liquid electrolyte, soft matter phase electrolyte, solid-state electrolyte, or a combination thereof.

The electrolyte may contain an alkali salt selected from lithium perchlorate (LiClO$_4$), lithium hexafluorophosphate (LiPF$_6$), lithium borofluoride (LiBF$_4$), lithium hexafluoro-arsenide (LiAsF$_6$), lithium trifluoro-metasulfonate (LiCF$_3$SO$_3$), bis-trifluoromethyl sulfonylimide lithium (LiN(CF$_3$SO$_2$)$_2$), Lithium bis(oxalato)borate (LiBOB), lithium oxalyldifluoroborate (LiBF$_2$C$_2$O$_4$), lithium oxalyldifluoroborate (LiBF$_2$C$_2$O$_4$), Lithium nitrate (LiNO$_3$), Li-Fluoroalkyl-Phosphates (LiPF3(CF$_2$CF$_3$)$_3$), lithium bisperfluoroethysulfonylimide (LiBETI), an ionic liquid salt, sodium perchlorate (NaClO$_4$), potassium perchlorate (KClO$_4$), sodium hexafluorophosphate (NaPF$_6$), potassium hexafluorophosphate (KPF$_6$), sodium borofluoride (NaBF$_4$), potassium borofluoride (KBF$_4$), sodium hexafluoroarsenide, potassium hexafluoroarsenide, sodium trifluoro-metasulfonate (NaCF$_3$SO$_3$), potassium trifluoro-metasulfonate (KCF$_3$SO$_3$), bis-trifluoromethyl sulfonylimide sodium (NaN(CF$_3$SO$_2$)$_2$), sodium trifluoromethanesulfonimide (NaTFSI), bis-trifluoromethyl sulfonylimide potassium (KN(CF$_3$SO$_2$)$_2$), or a combination thereof.

In the alkali metal-selenium battery, the solvent may be selected from ethylene carbonate (EC), dimethyl carbonate (DMC), methylethyl carbonate (MEC), diethyl carbonate (DEC), ethyl propionate, methyl propionate, propylene carbonate (PC), γ-butyrolactone (γ-BL), acetonitrile (AN), ethyl acetate (EA), propyl formate (PF), methyl formate (MF), toluene, xylene or methyl acetate (MA), fluoroethylene carbonate (FEC), vinylene carbonate (VC), allyl ethyl carbonate (AEC), 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, room temperature ionic liquid, or a combination thereof.

The invention also includes a process for producing the graphene foam-protected selenium cathode layer. The process comprises: (A) preparing a layer of solid graphene foam having pores (or cells) and pore/cell walls containing graphene sheets and having a physical density from 0.001 g/cm$^3$ to 1.5 g/cm$^3$; and (B) infiltrating or impregnating selenium into the pores to obtain the graphene foam-protected selenium cathode layer; wherein the graphene sheets are selected from a pristine graphene or a non-pristine graphene material, having a content of non-carbon elements greater than 2% by weight, selected from graphene oxide, reduced graphene oxide, graphene fluoride, graphene chloride, graphene bromide, graphene iodide, hydrogenated graphene, nitrogenated graphene, chemically functionalized graphene, or a combination thereof.

In certain embodiments, step (A) of the process comprises:
 (a) preparing a graphene dispersion having multiple graphene sheets dispersed in a liquid medium, wherein the graphene sheets are selected from a pristine graphene or a non-pristine graphene material, having a content of non-carbon elements greater than 2% by weight, selected from graphene oxide, reduced graphene oxide, graphene fluoride, graphene chloride, graphene bromide, graphene iodide, hydrogenated graphene, nitrogenated graphene, chemically functionalized graphene, or a combination thereof and wherein said graphene dispersion contains an optional blowing agent having a blowing agent-to-graphene material weight ratio from 0/1.0 to 1.0/1.0;
 (b) dispensing and depositing the graphene dispersion onto a surface of a supporting substrate to form a wet layer of graphene;
 (c) partially or completely removing the liquid medium from the wet layer of graphene to form a dried layer of graphene; and
 (d) heat treating the dried layer of graphene at a first heat treatment temperature selected from 80° C. to 3,200° C. at a desired heating rate sufficient to induce volatile gas molecules from the non-carbon elements or to activate the blowing agent for producing a sheet or roll of solid graphene foam having multiple pores (cells) and pore walls (cell walls) containing graphene sheets; and These procedures are then followed by step (B) of impregnating or infiltrating the pores (cells) in the solid graphene foam with Se to form the graphene foam-protected selenium cathode layer. The pores (cells) in the solid graphene foam produced in this manner tend to be interconnected cells that are open cells (open to the outside air). These open and interconnected cells enable subsequent infiltration or impregnation by selenium using any physical, chemical, or electrochemical technique.

This infiltration or impregnation step may include a procedure of melt infusion, sputtering, physical vapor infiltration, chemical vapor infiltration, solution deposition, electrochemical deposition, chemical deposition, redox deposition, or a combination thereof.

The dispensing and depositing procedure may include subjecting the graphene dispersion to an orientation-inducing stress.

In certain embodiments, the process further includes a step of heat-treating the solid graphene foam at a second heat treatment temperature higher than the first heat treatment temperature for a length of time sufficient for increasing the thermal conductivity of the solid graphene foam wherein the pore walls contain stacked graphene planes having an inter-plane spacing $d_{002}$ from 0.3354 nm to 0.36 nm and a content of non-carbon elements less than 2% by weight.

In certain embodiments, the graphene sheets contain pristine graphene and said graphene dispersion contains a blowing agent having a blowing agent-to-pristine graphene weight ratio from 0.01/1.0 to 1.0/1.0.

The blowing agent is a physical blowing agent, a chemical blowing agent, a mixture thereof, a dissolution-and-leaching agent, or a mechanically introduced blowing agent.

The process may be a roll-to-roll process wherein said steps (b) and (c) include feeding said supporting substrate from a feeder roller to a deposition zone, continuously or intermittently depositing the graphene dispersion onto a surface of the supporting substrate to form the wet layer of graphene thereon, drying the wet layer of graphene, and collecting the dried layer of graphene material deposited on the supporting substrate on a collector roller The first heat treatment temperature is preferably selected from 100° C. to 1,500° C. The second heat treatment temperature may include at least a temperature selected from (A) 300-1,500° C., (B) 1,500-2,100° C., or (C) 2,100-3,200° C.

The step (d) of heat treating the dried layer of graphene at a first heat treatment temperature may be conducted under a compressive stress. The process may further comprise a compression step to reduce a thickness, a pore size, or a porosity level of the solid graphene foam.

In certain preferred embodiments, the process may further comprise a step of chemically functionalizing graphene sheets in the solid graphene foam, after step (d), to promote or facilitate infiltration or impregnation of foam pores with Se or Se and a second element (S, Te, Bi, Sn, etc.). The chemical functionalization step may include attaching a functional group recited earlier in this section.

We have surprisingly observed that the graphene sheets on the pore walls in the solid graphene foam may be chemically functionalized to make the graphene sheets in a liquid medium exhibit a negative Zeta potential from −55 mV to −0.1 mV. Such a Zeta potential is significantly more effective in attracting Se ions to graphene surfaces of the solid graphene foam using a solution-based deposition approach. Prior to the step of chemically functionalizing graphene sheets, these graphene sheets may be essentially free of any significant amount of oxygen and hydrogen and they are no longer graphene oxide.

The process may further comprise, after step (e), of mechanically compressing or consolidating the Se-infiltrated graphene foam structure.

The graphene dispersion may further contain particles or fibrils of a metal, carbon or graphite filler to induce orientation of said graphene sheets inclined at an angle of 15-90 degrees relative to said paper sheet plane, wherein said carbon or graphite filler is selected from a carbon or graphite fiber, carbon or graphite nanofiber, carbon nanotube, carbon nanorod, mesophase carbon particle, mesocarbon microbead, expanded graphite flake, needle coke, carbon black or acetylene black, activated carbon, or a combination thereof, and the metal filler is selected from Ti, V, Cr, Mn, Fe, Co, Ni, Cu, Zn, Zr, Mo, Pd, Ag, Cd, Au, Pt, W, Al, Sn, In, Pb, Bi, an alloy thereof, or a mixture thereof and wherein said metal-, carbon-, or graphite-to-graphene ratio is from 1/100 to 1/1.

In certain embodiments, the graphene sheets in the graphene dispersion occupy a weight fraction of 0.1% to 25% (preferably from 3% to 15%) based on the total weight of graphene sheets and liquid medium combined.

In certain embodiments, the graphene dispersion has greater than 3% by weight of graphene or graphene oxide sheets dispersed in the fluid medium to form a liquid crystal phase, which promotes alignment of graphene sheets during the sheet forming procedure.

In the aforementioned embodiments of the invention, the selenium infiltration procedure is conducted after the formation of the solid graphene foam. In certain alternative embodiments, the inventive process for producing the graphene foam-protected selenium cathode layer comprises:
(a) preparing a graphene dispersion having multiple graphene sheets and multiple selenium particles dispersed in a liquid medium, wherein the graphene sheets are selected from a pristine graphene or a non-pristine graphene material, having a content of non-carbon elements greater than 2% by weight, selected from graphene oxide, reduced graphene oxide, graphene fluoride, graphene chloride, graphene bromide, graphene iodide, hydrogenated graphene, nitrogenated graphene, chemically functionalized graphene, or a combination thereof and wherein said graphene dispersion contains an optional blowing agent having a blowing agent-to-graphene material weight ratio from 0/1.0 to 1.0/1.0;
(b) dispensing and depositing the graphene dispersion onto a surface of a supporting substrate to form a wet layer of graphene;
(c) partially or completely removing the liquid medium from the wet layer of graphene to form a dried layer of graphene; and
(d) heat treating the dried layer of graphene at a first heat treatment temperature selected from 80° C. to 3,200° C. (preferably less than 1,500° C. and further preferably less than 800° C.) at a desired heating rate sufficient to induce volatile gas molecules from the non-carbon elements or to activate the blowing agent for producing a sheet or roll of solid graphene foam having multiple pores (cells) containing selenium particles enclosed therein and pore walls (cell walls) containing graphene sheets to form the graphene foam-protected selenium cathode layer.

This sequence of steps enables uniform dispersion of Se particles in the final solid graphene foam structure. These particles can be embedded in pores of the graphene foam without requiring the cells (pores) to be open cells. The Se particles in these closed cells are better protected and not being subjected to dissolution of selenium and lithium polyselenide in electrolyte and migration of these species out of the pores toward the anode side (the shuttle effect being essentially suppressed).

The selenium particles used in step (a) preferably have a dimension (diameter) from 5 nm to 20 µm, preferably less than 5 µm and further preferably less than 1 µm).

In this process, the solid graphene foam, when measured without selenium, typically has a density ranging from about 0.01 g/cm$^3$ to about 1.5 g/cm$^3$. The selenium typically occupies a weight fraction of 40%-95% based on the total weight of the solid graphene foam and selenium combined. In this process, the graphene dispersion may further contain a carbon or graphite filler selected from a carbon or graphite fiber, carbon or graphite nanofiber, carbon nanotube, carbon nanorod, mesophase carbon particle, mesocarbon microbead, expanded graphite flake, needle coke, carbon black or acetylene black, activated carbon, or a combination thereof and the carbon or graphite filler is incorporated into the pore walls.

The process may be a roll-to-roll process wherein said steps (b) and (c) include feeding said supporting substrate from a feeder roller to a deposition zone, continuously depositing the graphene dispersion onto a surface of the supporting substrate to form the wet layer of graphene mixture thereon, drying the wet layer of graphene, and collecting the dried layer of graphene mixture deposited on the supporting substrate on a collector roller.

In certain embodiments, step (d) of heat treating the dried layer of graphene mixture at a first heat treatment temperature is conducted under a compressive stress.

In certain embodiments, selenium is in a form of nano-coating or particles having a thickness of diameter from 0.5 nm to 100 nm.

The graphene foam-protected selenium cathode layer can have a thickness from 100 nm to 2 mm, preferably or more typically from 10 µm to 500 µm.

The process may further include a step of combining an anode, a cathode comprising the graphene foam-protected selenium cathode layer, an electrolyte in ionic contact with the cathode and the anode, together to form an alkali metal-selenium battery cell.

DESCRIPTION OF THE PREFERRED EMBODIMENTS

For convenience, the following discussion of preferred embodiments is primarily based on cathodes for Li—Se cells, but the same or similar methods are applicable to deposition of Se in the cathode for the Na—Se and K—Se cells. Examples are presented for Li—Se cells, Na—Se cells, and K—Se cells.

The present invention provides a graphene foam-protected selenium cathode layer, preferably in a sheet form or a roll of graphene foam sheet. However, this cathode layer can be in any practical shape. In certain preferred embodiments, a graphene foam-protected selenium cathode layer for an alkali metal-selenium cell comprises: (a) a sheet or a roll of solid graphene foam composed of multiple pores (cells) and pore walls containing graphene sheets, wherein the graphene sheets contain a pristine graphene material having less than 0.01% by weight of non-carbon elements or a non-pristine graphene material having 0.01% to 20% by weight of non-carbon elements, wherein the non-pristine graphene is selected from graphene oxide, reduced graphene oxide, graphene fluoride, graphene chloride, graphene bromide, graphene iodide, hydrogenated graphene, nitrogenated graphene, boron-doped graphene, nitrogen-doped graphene, chemically functionalized graphene, or a combination thereof, wherein the graphene sheets are interconnected or chemically merged together without an adhesive resin; and (b) selenium coating or particles residing in the pores or bonded to the pore walls of the solid foam.

Figure 2A:
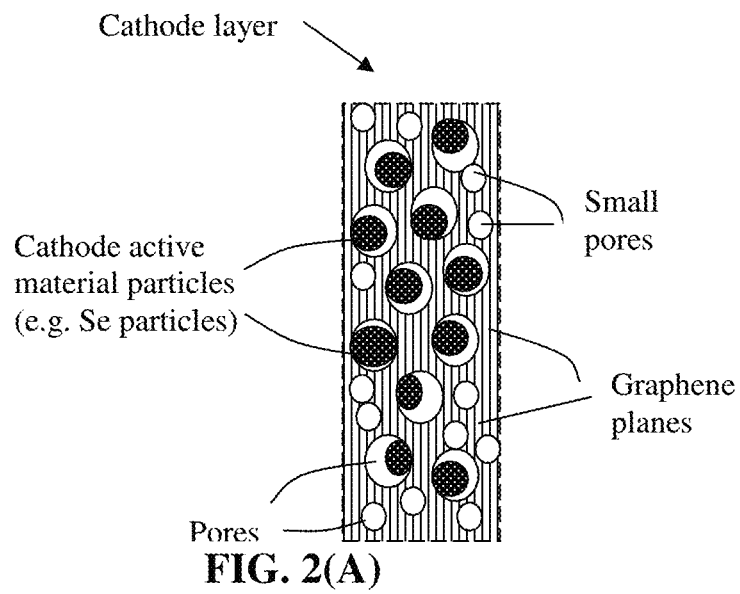
FIG. 2(A) Schematic of solid graphene foam containing Se particles or coating residing in pores (closed cells) of this closed-cell graphene foam.
Figure 2B:
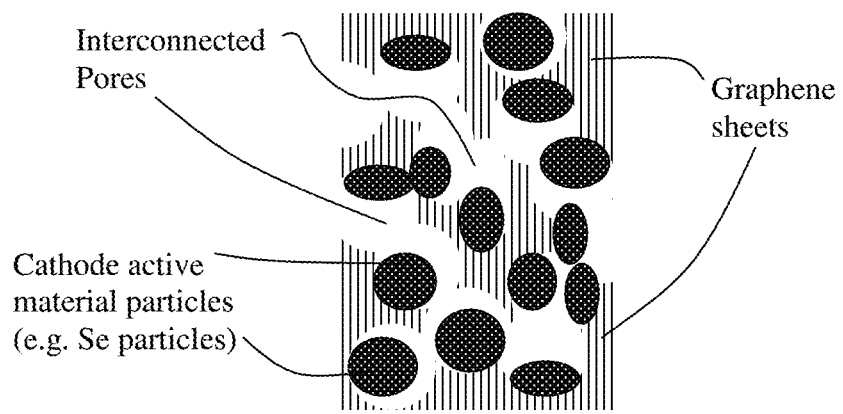
FIG. 2(B) Schematic of solid graphene foam containing Se particles or coating residing in interconnected pores (open cells) of this open-cell graphene foam.

Schematically shown in FIG. 2(A) is a solid graphene foam structure containing Se particles or coating residing in the pores (closed cells) of this closed-cell graphene foam. FIG. 2(B) shows a schematic of another solid graphene foam containing Se particles or coating residing in the interconnected pores (open cells) of this open-cell graphene foam.

The solid graphene foam may contain a three-dimensional network of interconnected open cells. The solid graphene foam, when measured without Se, has a density ranging from about 0.001 g/cm³ to about 1.7 g/cm³, more preferably and typically from about 0.01 g/cm³ to about 1.5 g/cm³, and most preferably from about 0.01 g/cm³ to about 0.8 g/cm³.

The selenium preferably occupies a weight fraction of 40%-95% based on the total weight of the solid graphene foam and selenium combined. The selenium coating or particles preferably have a thickness of diameter from 0.5 nm to 100 nm (more preferably from 1 nm to 10 nm). The solid graphene foam may further accommodate a second element selected from Sn, Sb, Bi, S, Te, or a combination thereof and the weight of the second element is less than the weight of selenium. The second element may be mixed with selenium (Se) to form a mixture or alloy. The second element, the mixture, or the alloy may be preferably in a nanoparticle or nanocoating form having a diameter or thickness from 0.5 nm to 100 nm. The second element resides in the pores or bonded to the pore walls of the solid graphene foam.

In certain embodiments, the solid graphene foam in the graphene foam-protected Se cathode layer can optionally further contain a carbon or graphite filler selected from a carbon or graphite fiber, carbon or graphite nanofiber, carbon nanotube, carbon nanorod, mesophase carbon particle, mesocarbon microbead, expanded graphite flake, needle coke, carbon black or acetylene black, activated carbon, or a combination thereof.

The invention also includes a process for producing the graphene foam-protected selenium cathode layer. In certain embodiments, the process comprises: (a) preparing a graphene dispersion having multiple graphene sheets dispersed in a liquid medium, wherein the graphene sheets are selected from a pristine graphene or a non-pristine graphene material, having a content of non-carbon elements greater than 2% by weight, selected from graphene oxide, reduced graphene oxide, graphene fluoride, graphene chloride, graphene bromide, graphene iodide, hydrogenated graphene, nitrogenated graphene, chemically functionalized graphene, or a combination thereof and wherein said graphene dispersion contains an optional blowing agent having a blowing agent-to-graphene material weight ratio from 0/1.0 to 1.0/1.0; (b) dispensing and depositing the graphene dispersion onto a surface of a supporting substrate to form a wet layer of graphene; (c) partially or completely removing the liquid medium from the wet layer of graphene to form a dried layer of graphene; (d) heat treating the dried layer of graphene at a first heat treatment temperature selected from 80° C. to 3,200° C. at a desired heating rate sufficient to induce volatile gas molecules from the non-carbon elements or to activate the blowing agent for producing a sheet or roll of solid graphene foam having multiple pores (cells) and pore walls (cell walls) containing graphene sheets; and (e) impregnating or infiltrating the pores in the solid graphene foam with Se to form the graphene foam-protected selenium cathode layer. This infiltration or impregnation step may include a procedure of melt infusion, physical vapor infiltration, chemical vapor infiltration, solution deposition, electrochemical deposition, chemical deposition, redox deposition, or a combination thereof. The dispensing and depositing procedure in step (b) may include subjecting the graphene dispersion to an orientation-inducing stress.

In certain embodiments, the process further includes a step of heat-treating the solid graphene foam at a second heat treatment temperature higher than the first heat treatment temperature for a length of time sufficient for increasing the thermal conductivity of the solid graphene foam wherein the pore walls contain stacked graphene planes having an interplane spacing $d_{002}$ from 0.3354 nm to 0.36 nm and a content of non-carbon elements less than 2% by weight.

Some details about how to prepare graphene dispersion in step (a) of the invented process are presented below. The graphite intercalation compound (GIC) or graphite oxide may be obtained by immersing powders or filaments of a starting graphitic material in an intercalating/oxidizing liquid medium (e.g. a mixture of sulfuric acid, nitric acid, and potassium permanganate) in a reaction vessel. The starting graphitic material may be selected from natural graphite, artificial graphite, mesophase carbon, mesophase pitch, mesocarbon microbead, soft carbon, hard carbon, coke, carbon fiber, carbon nanofiber, carbon nanotube, or a combination thereof.

When the starting graphite powders or filaments are mixed in the intercalating/oxidizing liquid medium, the resulting slurry is a heterogeneous suspension and appears dark and opaque. When the oxidation of graphite proceeds at a reaction temperature for a sufficient length of time (4-120 hours at room temperature, 20-25° C.), the reacting mass can eventually become a suspension that appears slightly green and yellowish, but remain opaque. If the degree of oxidation is sufficiently high (e.g. having an oxygen content between 20% and 50% by weight, preferably between 30% and 50%) and all the original graphene planes are fully oxidized, exfoliated and separated to the extent that each oxidized graphene plane (now a graphene oxide sheet or molecule) is surrounded by the molecules of the liquid medium, one obtains a GO gel.

Figure 1:
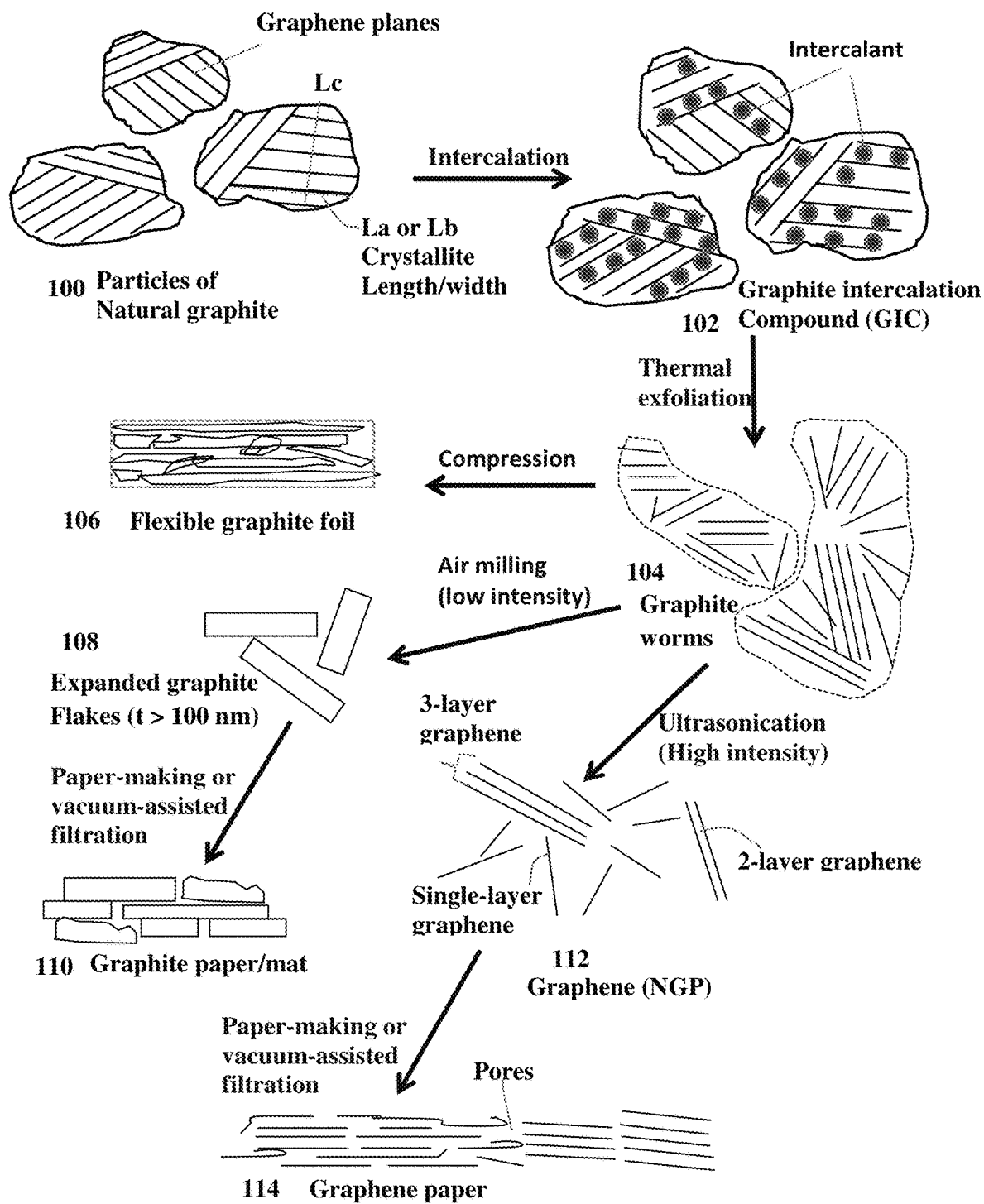
FIG. 1 Schematic drawing illustrating the processes for producing conventional paper, mat, film, and membrane of simply aggregated graphite or NGP flakes/platelets. All processes begin with intercalation and/or oxidation treatment of graphitic materials (e.g. natural graphite particles).

The aforementioned features are further described and explained in detail as follows: As illustrated in FIG. 1, a graphite particle (e.g. 100) is typically composed of multiple graphite crystallites or grains. A graphite crystallite is made up of layer planes of hexagonal networks of carbon atoms. These layer planes of hexagonally arranged carbon atoms are substantially flat and are oriented or ordered so as to be substantially parallel and equidistant to one another in a particular crystallite. These layers of hexagonal-structured carbon atoms, commonly referred to as graphene layers or basal planes, are weakly bonded together in their thickness direction (crystallographic c-axis direction) by weak van der Waals forces and groups of these graphene layers are arranged in crystallites. The graphite crystallite structure is usually characterized in terms of two axes or directions: the c-axis direction and the a-axis (or b-axis) direction. The c-axis is the direction perpendicular to the basal planes. The a- or b-axes are the directions parallel to the basal planes (perpendicular to the c-axis direction).

A highly ordered graphite particle can consist of crystallites of a considerable size, having a length of $L_a$ along the crystallographic a-axis direction, a width of $L_b$ along the crystallographic b-axis direction, and a thickness $L_c$ along the crystallographic c-axis direction. The constituent graphene planes of a crystallite are highly aligned or oriented with respect to each other and, hence, these anisotropic structures give rise to many properties that are highly directional. For instance, the thermal and electrical conductivity of a crystallite are of great magnitude along the plane directions (a- or b-axis directions), but relatively low in the perpendicular direction (c-axis). As illustrated in the upper-left portion of FIG. 1, different crystallites in a graphite particle are typically oriented in different directions and, hence, a particular property of a multi-crystallite graphite particle is the directional average value of all the constituent crystallites.

Due to the weak van der Waals forces holding the parallel graphene layers, natural graphite can be treated so that the spacing between the graphene layers can be appreciably opened up so as to provide a marked expansion in the c-axis direction, and thus form an expanded graphite structure in which the laminar character of the carbon layers is substantially retained. The process for manufacturing flexible graphite is well-known in the art. In general, flakes of natural graphite (e.g. 100 in FIG. 1) are intercalated in an acid solution to produce graphite intercalation compounds (GICs, 102). The GICs are washed, dried, and then exfoliated by exposure to a high temperature for a short period of time. This causes the flakes to expand or exfoliate in the c-axis direction of the graphite up to 80-300 times of their original dimensions. The exfoliated graphite flakes are vermiform in appearance and, hence, are commonly referred to as worms 104. These worms of graphite flakes which have been greatly expanded can be formed without the use of a binder into cohesive or integrated sheets of expanded graphite, e.g. webs, papers, strips, tapes, foils, mats or the like (typically referred to as "flexible graphite" 106) having a typical density of about 0.04-2.0 g/cm$^3$ for most applications.

In one prior art process, the exfoliated graphite (or mass of graphite worms) is re-compressed by using a calendaring or roll-pressing technique to obtain flexible graphite foils (106 in FIG. 1), which are typically 100-300 μm thick.

Largely due to the presence of defects, commercially available flexible graphite foils normally have an in-plane electrical conductivity of 1,000-3,000 S/cm, through-plane (thickness-direction or Z-direction) electrical conductivity of 15-30 S/cm, in-plane thermal conductivity of 140-300 W/mK, and through-plane thermal conductivity of approximately 10-30 W/mK. These defects are also responsible for the low mechanical strength (e.g. defects are potential stress concentration sites where cracks are preferentially initiated). These properties are inadequate for many thermal management applications and the present invention is made to address these issues. In another prior art process, the exfoliated graphite worm may be impregnated with a resin and then compressed and cured to form a flexible graphite composite, which is normally of low strength as well. In addition, upon resin impregnation, the electrical and thermal conductivity of the graphite worms could be reduced by two orders of magnitude.

Alternatively, the exfoliated graphite may be subjected to high-intensity mechanical shearing/separation treatments using a high-intensity air jet mill, high-intensity ball mill, or ultrasonic device to produce separated nanographene platelets (NGPs) with all the graphene platelets thinner than 100 nm, mostly thinner than 10 nm, and, in many cases, being single-layer graphene (also illustrated as 112 in FIG. 1). An NGP is composed of a graphene sheet or a plurality of graphene sheets with each sheet being a two-dimensional, hexagonal structure of carbon atoms.

Further alternatively, with a low-intensity shearing, graphite worms tend to be separated into the so-called expanded graphite flakes (108 in FIG. 1) having a thickness >100 nm. These flakes can be formed into graphite paper or mat 106 using a paper- or mat-making process. This expanded graphite paper or mat 106 is just a simple aggregate or stack of discrete flakes having defects, interruptions, and mis-orientations between these discrete flakes.

For the purpose of defining the geometry and orientation of an NGP, the NGP is described as having a length (the largest dimension), a width (the second largest dimension), and a thickness. The thickness is the smallest dimension, which is no greater than 100 nm, preferably smaller than 10 nm and most preferably 0.34 nm-1.7 nm in the present application. When the platelet is approximately circular in shape, the length and width are referred to as diameter. In the presently defined NGPs, both the length and width can be smaller than 1 μm, but can be larger than 200 μm.

A mass of multiple NGPs (including discrete sheets/platelets of single-layer and/or few-layer graphene or graphene oxide) may be readily dispersed in water or a solvent and then made into a graphene paper (114 in FIG. 1) using a paper-making process. Many discrete graphene sheets are folded or interrupted (not integrated), most of platelet orientations being not parallel to the paper surface. The existence of many defects or imperfections leads to poor electrical and thermal conductivity in both the in-plane and the through-plane (thickness-) directions.

Fluorinated graphene or graphene fluoride is herein used as an example of the halogenated graphene material group. There are two different approaches that have been followed to produce fluorinated graphene: (1) fluorination of pre-synthesized graphene: This approach entails treating graphene prepared by mechanical exfoliation or by CVD growth with fluorinating agent such as $XeF_2$, or F-based plasmas; (2) Exfoliation of multilayered graphite fluorides: Both mechanical exfoliation and liquid phase exfoliation of graphite fluoride can be readily accomplished [F. Karlicky, et al. "*Halogenated Graphenes: Rapidly Growing Family of Graphene Derivatives*" ACS Nano, 2013, 7 (8), pp 6434-6464].

Interaction of $F_2$ with graphite at high temperature leads to covalent graphite fluorides $(CF)_n$ or $(C_2F)_n$, while at low temperatures graphite intercalation compounds (GIC) $C_xF$ ($2 \leq x \leq 24$) form. In $(CF)_n$ carbon atoms are sp3-hybridized and thus the fluorocarbon layers are corrugated consisting of trans-linked cyclohexane chairs. In $(C_2F)_n$ only half of the C atoms are fluorinated and every pair of the adjacent carbon sheets are linked together by covalent C—C bonds. Systematic studies on the fluorination reaction showed that the resulting F/C ratio is largely dependent on the fluorination temperature, the partial pressure of the fluorine in the fluorinating gas, and physical characteristics of the graphite precursor, including the degree of graphitization, particle size, and specific surface area. In addition to fluorine ($F_2$), other fluorinating agents may be used, although most of the available literature involves fluorination with $F_2$ gas, sometimes in presence of fluorides.

For exfoliating a layered precursor material to the state of individual single graphene layers or few-layers, it is necessary to overcome the attractive forces between adjacent layers and to further stabilize the layers. This may be achieved by either covalent modification of the graphene surface by functional groups or by non-covalent modification using specific solvents, surfactants, polymers, or donor-acceptor aromatic molecules. The process of liquid phase exfoliation includes ultra-sonic treatment of a graphite fluoride in a liquid medium to produce graphene fluoride sheets dispersed in the liquid medium. The resulting dispersion can be directly made into a sheet of paper or a roll of paper.

The nitrogenation of graphene can be conducted by exposing a graphene material, such as graphene oxide, to ammonia at high temperatures (200-400° C.). Nitrogenated graphene could also be formed at lower temperatures by a hydrothermal method; e.g. by sealing GO and ammonia in an autoclave and then increased the temperature to 150-250° C. Other methods to synthesize nitrogen doped graphene include nitrogen plasma treatment on graphene, arc-discharge between graphite electrodes in the presence of ammonia, ammonolysis of graphene oxide under CVD conditions, and hydrothermal treatment of graphene oxide and urea at different temperatures.

For the purpose of defining the claims of the instant application, NGPs or graphene materials include discrete sheets/platelets of single-layer and multi-layer (typically less than 10 layers, the few-layer graphene) pristine graphene, graphene oxide, reduced graphene oxide (RGO), graphene fluoride, graphene chloride, graphene bromide, graphene iodide, hydrogenated graphene, nitrogenated graphene, chemically functionalized graphene, doped graphene (e.g. doped by B or N). Pristine graphene has essentially 0% oxygen. RGO typically has an oxygen content of 0.001%-5% by weight. Graphene oxide (including RGO) can have 0.001%-50% by weight of oxygen. Other than pristine graphene, all the graphene materials have 0.001%-50% by weight of non-carbon elements (e.g. O, H, N, B, F, Cl, Br, I, etc.). These materials are herein referred to as non-pristine graphene materials. The presently invented graphene-carbon foam can contain pristine or non-pristine graphene and the invented method allows for this flexibility.

Briefly, the process for producing the invented solid graphene foam (e.g. in a layer form) comprises the following steps:

(a) preparing a graphene dispersion having sheets or molecules of a graphene material dispersed in a liquid medium, wherein the graphene material is selected from pristine graphene, graphene oxide, reduced graphene oxide, graphene fluoride, graphene chloride, graphene bromide, graphene iodide, hydrogenated graphene, nitrogenated graphene, chemically functionalized graphene, or a combination thereof and wherein the dispersion contains an optional blowing agent with a blowing agent-to-graphene material weight ratio from 0/1.0 to 1.0/1.0 (this blowing agent is normally required if the graphene material is pristine graphene, typically having a blowing agent-to-pristine graphene weight ratio from 0.01/1.0 to 1.0/1.0);

(b) dispensing and depositing the graphene dispersion onto a surface of a supporting substrate (e.g. plastic film, rubber sheet, metal foil, glass sheet, paper sheet, etc.) to form a wet layer of graphene-anode material mixture, wherein the dispensing and depositing procedure (e.g. coating or casting) preferably includes subjecting the graphene dispersion to an orientation-inducing stress (e.g. via slot-die coating, comma coating, reverse-roll coating, casting; etc.);

(c) partially or completely removing the liquid medium from the wet layer of graphene material to form a dried layer of material mixture, with the graphene material having a content of non-carbon elements (e.g. O, H, N, B, F, Cl, Br, I, etc.) no less than 5% by weight (this non-carbon content, when being removed via heat-induced decomposition, produces volatile gases that act as a foaming agent or blowing agent); and (d) heat treating the dried layer of material mixture at a first heat treatment temperature from 100° C. to 3,000° C. at a desired heating rate sufficient to induce volatile gas molecules from the non-carbon elements in the graphene material or to activate the blowing agent for producing the solid graphene foam. The graphene foam typically has a density from 0.01 to 1.7 g/cm$^3$ (more typically from 0.1 to 1.5 g/cm$^3$, and even more typically from 0.1 to 1.0 g/cm$^3$, and most typically from 0.2 to 0.75 g/cm$^3$), or a specific surface area from 50 to 3,000 m$^2$/g (more typically from 200 to 2,000 m$^2$/g, and most typically from 500 to 1,500 m$^2$/g).

The process may further include a step (e) of impregnating or infiltrating the solid graphene foam with selenium.

The pores in the graphene foam are formed slightly before, during, or after sheets of a graphene material are (1) chemically linked/merged together (edge-to-edge and/or face-to-face) typically at a temperature from 100 to 1,500° C. and/or (2) re-organized into larger graphite crystals or domains (herein referred to as re-graphitization) along the pore walls at a high temperature (typically >2,100° C. and more typically >2,500° C.). Pores are formed due to the evolution of volatile gases (from a blowing agent and/or non-carbon elements, such as —OH, —F, etc.) during the heat treatment of the dried graphene layer.

The presently invented solid graphene foam can be prepared such that it exhibits not only a controllable porosity and density, but also excellent elasticity. In particular, the solid graphene foam in accordance with the invention surprisingly can exhibit a low compression set value (for example less than 15%) when compressed 80% or more of its original volume, or a compression set less than 10% when compressed 50% or more of its original volume. The ability of the pore walls to snap back upon release of a mechanical stress exerted on this type of graphene foam likely originates from the graphene sheets that are bonded and joint to form larger and stronger graphene planes during heat treatments. A plausible mechanism may be illustrated in FIG. 3.

A blowing agent or foaming agent is a substance which is capable of producing a cellular or foamed structure via a foaming process in a variety of materials that undergo hardening or phase transition, such as polymers (plastics and rubbers), glass, and metals. They are typically applied when the material being foamed is in a liquid state. It has not been previously known that a blowing agent can be used to create a foamed material while in a solid state. More significantly, it has not been taught or hinted that an aggregate of sheets of a graphene material can be converted into a graphene foam via a blowing agent. The cellular structure in a matrix is typically created for the purpose of reducing density, increasing thermal resistance and acoustic insulation, while increasing the thickness and relative stiffness of the original polymer.

Blowing agents or related foaming mechanisms to create pores or cells (bubbles) in a matrix for producing a foamed or cellular material, can be classified into the following groups:

(a) Physical blowing agents: e.g. hydrocarbons (e.g. pentane, isopentane, cyclopentane), chlorofluorocarbons (CFCs), hydrochlorofluorocarbons (HCFCs), and liquid CO$_2$. The bubble/foam-producing process is endothermic, i.e. it needs heat (e.g. from a melt process or the chemical exotherm due to cross-linking), to volatize a liquid blowing agent.

(b) Chemical blowing agents: e.g. isocyanate, azo-, hydrazine and other nitrogen-based materials (for thermoplastic and elastomeric foams), sodium bicarbonate (e.g. baking soda, used in thermoplastic foams). Here gaseous products and other by-products are formed by a chemical reaction, promoted by process or a reacting polymer's exothermic heat. Since the blowing reaction involves forming low molecular weight compounds that act as the blowing gas, additional exothermic heat is also released. Powdered titanium hydride is used as a foaming agent in the production of metal foams, as it decomposes to form titanium and hydrogen gas at elevated temperatures. Zirconium (II) hydride is used for the same purpose. Once formed the low molecular weight compounds will never revert to the original blowing agent(s), i.e. the reaction is irreversible.

(c) Mixed physical/chemical blowing agents: e.g. used to produce flexible polyurethane (PU) foams with very low densities. Both the chemical and physical blowing can be used in tandem to balance each other out with respect to thermal energy released/absorbed; hence, minimizing temperature rise. For instance, isocyanate and water (which react to form CO$_2$) are used in combination with liquid CO$_2$ (which boils to give gaseous form) in the production of very low density flexible PU foams for mattresses.

(d) Mechanically injected agents: Mechanically made foams involve methods of introducing bubbles into liquid polymerizable matrices (e.g. an unvulcanized elastomer in the form of a liquid latex). Methods include whisking-in air or other gases or low boiling volatile liquids in low viscosity lattices, or the injection of a gas into an extruder barrel or a die, or into injection molding barrels or nozzles and allowing the shear/mix action of the screw to disperse the gas uniformly to form very fine bubbles or a solution of gas in the melt. When the melt is molded or extruded and the part is at atmospheric pressure, the gas comes out of solution expanding the polymer melt immediately before solidification.

(e) Soluble and leachable agents: Soluble fillers, e.g. solid sodium chloride crystals mixed into a liquid urethane system, which is then shaped into a solid polymer part, the sodium chloride is later washed out by immersing the solid molded part in water for some time, to leave small inter-connected holes in relatively high density polymer products.

(f) We have found that the above five mechanisms can all be used to create pores in the graphene materials while they are in a solid state. Another mechanism of producing pores in a graphene material is through the generation and vaporization of volatile gases by removing those non-carbon elements in a high-temperature environment. This is a unique self-foaming process that has never been previously taught or suggested.

For step (e) of the presently invented process, selenium may be infiltrated or impregnated into the pores of the solid graphene foam and may be in a form of thin coating or small particles preferably having a thickness or diameter from 0.5 nm to 1 µm, more preferably smaller than 100 nm and further preferably smaller than 10 nm.

In certain embodiments, selenium fills into pores of the solid graphene foam, occupying a 70% or less of the pore volume (leaving behind no less than 30% empty space or gap, allowing the selenium to expand to fill in the pore without causing a significant volume expansion of the cathode layer), preferably occupying less than 50% pore volume fraction, and in some cases occupying less than 35% volume fraction of the pore.

This infiltration or impregnation step may include a procedure of melt infusion, physical vapor infiltration, sputtering, chemical vapor infiltration, solution deposition, electrochemical deposition, chemical deposition, redox deposition, or a combination thereof. In some embodiments, the step of impregnating selenium into the pores of the solid graphene foam is conducted chemically, electrochemically or electrolytically. These individual operations per se are well-known in the art.

Example 1: Various Blowing Agents and Pore-Forming (Bubble-Producing) Processes In the field of plastic processing, chemical blowing agents are mixed into the plastic pellets in the form of powder or pellets and dissolved at higher temperatures. Above a certain temperature specific for blowing agent dissolution, a gaseous reaction product (usually nitrogen or $CO_2$) is generated, which acts as a blowing agent. However, a chemical blowing agent cannot be dissolved in a graphene material, which is a solid, not liquid. This presents a challenge to make use of a chemical blowing agent to generate pores or cells in a graphene material.

After extensive experimenting, we have discovered that practically any chemical blowing agent (e.g. in a powder or pellet form) can be used to create pores or bubbles in a dried layer of graphene when the first heat treatment temperature is sufficient to activate the blowing reaction. The chemical blowing agent (powder or pellets) may be dispersed in the liquid medium to become a second dispersed phase (sheets of graphene material being the first dispersed phase) in the suspension, which can be deposited onto the solid supporting substrate to form a wet layer. This wet layer of graphene material may then be dried and heat treated to activate the chemical blowing agent. After a chemical blowing agent is activated and bubbles are generated, the resulting foamed graphene structure is largely maintained even when subsequently a higher heat treatment temperature is applied to the structure. This is quite unexpected, indeed.

Chemical foaming agents (CFAs) can be organic or inorganic compounds that release gasses upon thermal decomposition. CFAs are typically used to obtain medium- to high-density foams, and are often used in conjunction with physical blowing agents to obtain low-density foams. CFAs can be categorized as either endothermic or exothermic, which refers to the type of decomposition they undergo. Endothermic types absorb energy and typically release carbon dioxide and moisture upon decomposition, while the exothermic types release energy and usually generate nitrogen when decomposed. The overall gas yield and pressure of gas released by exothermic foaming agents is often higher than that of endothermic types. Endothermic CFAs are generally known to decompose in the range from 130 to 230° C. (266-446° F.), while some of the more common exothermic foaming agents decompose around 200° C. (392° F.). However, the decomposition range of most exothermic CFAs can be reduced by addition of certain compounds. The activation (decomposition) temperatures of CFAs fall into the range of our heat treatment temperatures. Examples of suitable chemical blowing agents include sodium bicarbonate (baking soda), hydrazine, hydrazide, azodicarbonamide (exothermic chemical blowing agents), nitroso compounds (e.g. N, N-dinitroso pentamethylene tetramine), hydrazine derivatives (e.g. 4,4'-oxybis (benzenesulfonyl hydrazide) and hydrazo dicarbonamide), and hydrogen carbonate (e.g. Sodium hydrogen carbonate). These are all commercially available in plastics industry.

In the production of foamed plastics, physical blowing agents are metered into the plastic melt during foam extrusion or injection molded foaming, or supplied to one of the precursor materials during polyurethane foaming. It has not been previously known that a physical blowing agent can be used to create pores in a graphene material, which is in a solid state (not melt). We have surprisingly observed that a physical blowing agent (e.g. $CO_2$ or $N_2$) can be injected into the stream of graphene suspension prior to being coated or cast onto the supporting substrate. This would result in a foamed structure even when the liquid medium (e.g. water and/or alcohol) is removed. The dried layer of graphene material is capable of maintaining a controlled amount of pores or bubbles during liquid removal and subsequent heat treatments.

Technically feasible blowing agents include carbon dioxide ($CO_2$), nitrogen ($N_2$), isobutane ($C_4H_{10}$), cyclopentane ($C_5H_{10}$), isopentane ($C_5H_{12}$), CFC-11 ($CFCl_3$), HCFC-22 ($CHF_2Cl$), HCFC-142b ($CF_2ClCH_3$), and HCFC-134a ($CH_2FCF_3$). However, in selecting a blowing agent, environmental safety is a major factor to consider. The Montreal Protocol and its influence on consequential agreements pose a great challenge for the producers of foam. Despite the effective properties and easy handling of the formerly applied chlorofluorocarbons, there was a worldwide agreement to ban these because of their ozone depletion potential (ODP). Partially halogenated chlorofluorocarbons are also not environmentally safe and therefore already forbidden in many countries. The alternatives are hydrocarbons, such as isobutane and pentane, and the gases such as $CO_2$ and nitrogen.

Except for those regulated substances, all the blowing agents recited above have been tested in our experiments. For both physical blowing agents and chemical blowing agents, the blowing agent amount introduced into the suspension is defined as a blowing agent-to-graphene material weight ratio, which is typically from 0/1.0 to 1.0/1.0.

Example 2: Preparation of Solid Graphene Foam from Graphene Oxide Sheets

Chopped graphite fibers with an average diameter of 12 μm and natural graphite particles were separately used as a starting material, which was immersed in a mixture of concentrated sulfuric acid, nitric acid, and potassium permanganate (as the chemical intercalate and oxidizer) to prepare graphite intercalation compounds (GICs). The starting material was first dried in a vacuum oven for 24 h at 80° C. Then, a mixture of concentrated sulfuric acid, fuming nitric acid, and potassium permanganate (at a weight ratio of 4:1:0.05) was slowly added, under appropriate cooling and stirring, to a three-neck flask containing fiber segments. After 5-16 hours of reaction, the acid-treated graphite fibers or natural graphite particles were filtered and washed thoroughly with deionized water until the pH level of the solution reached 6. After being dried at 100° C. overnight, the resulting graphite intercalation compound (GIC) or graphite oxide fiber was re-dispersed in water and/or alcohol to form a slurry.

In one sample, five grams of the graphite oxide fibers were mixed with 2,000 ml alcohol solution consisting of alcohol and distilled water with a ratio of 15:85 to obtain a slurry mass. Then, the mixture slurry was subjected to ultrasonic irradiation with a power of 200 W for various lengths of time. After 20 minutes of sonication, GO fibers were effectively exfoliated and separated into thin graphene oxide sheets with oxygen content of approximately 23%-31% by weight. The resulting suspension contains GO sheets being suspended in water. A chemical blowing agent (hydrazo dicarbonamide) was added to the suspension just prior to casting.

The resulting suspension was then cast onto a glass surface using a doctor's blade to exert shear stresses, inducing GO sheet orientations. The resulting GO coating films, after removal of liquid, have a thickness that can be varied from approximately 5 to 500 μm (preferably and typically from 10 μm to 50 μm).

Figure 4:
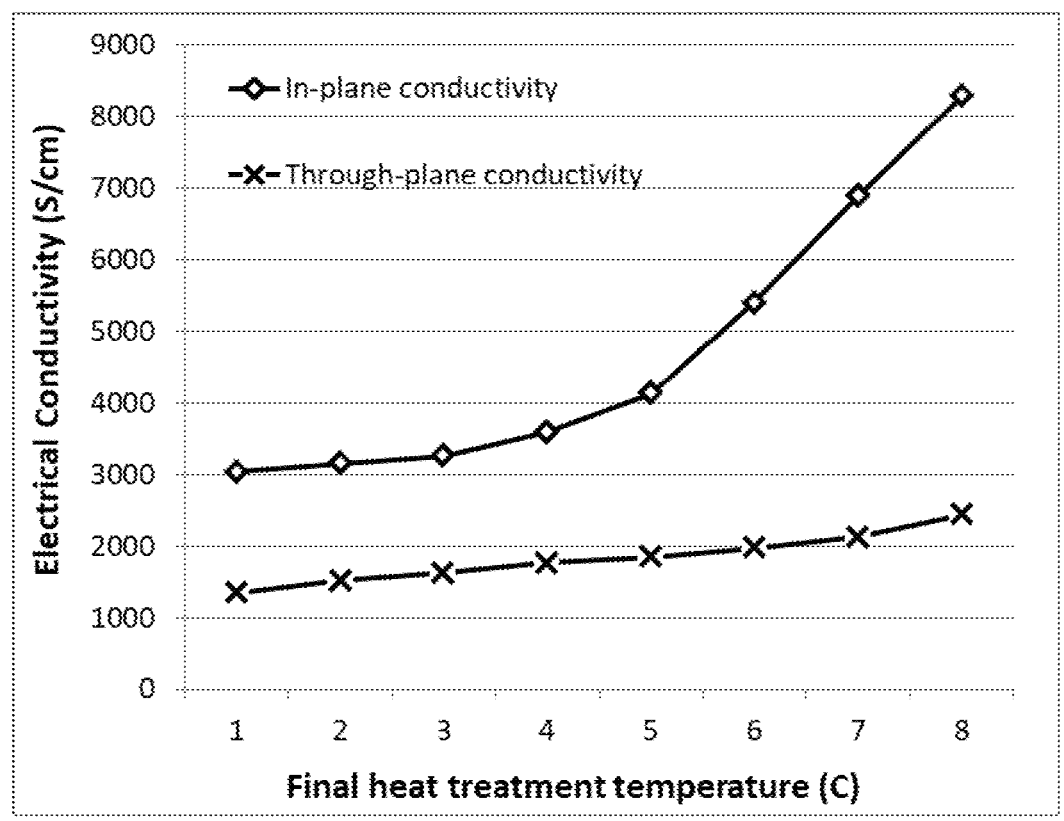
FIG. 4 In-plane and through-plane electrical conductivity values of some GO-derived graphene foam sheets (prepared by Comma coating, heat treatment, and compression).

For making a graphene foam specimen, the GO coating film was then subjected to heat treatments that typically involve an initial thermal reduction temperature of 80-350° C. for 1-8 hours, followed by heat-treating at a second temperature of 1,500-2,850° C. for 0.5 to 5 hours. It may be noted that we have found it essential to apply a compressive stress to the coating film sample while being subjected to the first heat treatment. This compress stress seems to have helped maintain good contacts between the graphene sheets so that chemical merging and linking between graphene sheets can occur while pores are being formed. Without such a compressive stress, the heat-treated film is typically excessively porous with constituent graphene sheets in the pore walls being very poorly oriented and incapable of chemical merging and linking with one another. As a result, the thermal conductivity, electrical conductivity, and mechanical strength of the graphene foam are severely compromised. Shown in FIG. 4 are the in-plane and through-plane electrical conductivity values of the GO-derived graphene foam sheets (prepared by Comma coating, heat treatment, and compression).

The solid graphene foam typically has a high degree of elasticity (fully recoverable elastic deformation) as reflected by a low permanent compression set (compression deformation that is not recoverable). The solid graphene foam, without selenium impregnation, typically has a compression set (at 15% compression) of 15% or less and, in many cases, 8% or less. Many specimens have a compression set (at 50% compression) of 10% or less and, in many cases, 5% or less.

The compression set measurement was conducted according to ASTM D395. The measured value of "compression set" is expressed as the percentage of the original deflection (i.e. a constant deflection test). A test specimen of the solid graphene foam was compressed at a nominated % for one minute at 25° C. Compression set was taken as the % of the original deflection after the specimen was allowed to recover at standard conditions for 30 minutes. The compression set value C can be calculated using the formula $[(t_0-t_i)/(t_0-t_n)] \times 100$, where $t_0$ is the original specimen thickness, $t_i$ the specimen thickness after testing, and $t_n$ is the spacer thickness which sets the % compression that the foam is to be subjected. For comparative results, the specimens tested all had the same dimensions: diameter of about 12 mm and height of about 8 mm.

Example 3: Preparation of Single-Layer Graphene Sheets from Mesocarbon Microbeads (MCMBs)

Mesocarbon microbeads (MCMBs) were supplied from China Steel Chemical Co., Kaohsiung, Taiwan. This material has a density of about 2.24 $g/cm^3$ with a median particle size of about 16 µm. MCMB (10 grams) were intercalated with an acid solution (sulfuric acid, nitric acid, and potassium permanganate at a ratio of 4:1:0.05) for 48-96 hours. Upon completion of the reaction, the mixture was poured into deionized water and filtered. The intercalated MCMBs were repeatedly washed in a 5% solution of HCl to remove most of the sulfate ions. The sample was then washed repeatedly with deionized water until the pH of the filtrate was no less than 4.5. The slurry was then subjected ultra-sonication for 10-100 minutes to produce GO suspensions. TEM and atomic force microscopic studies indicate that most of the GO sheets were single-layer graphene when the oxidation treatment exceeded 72 hours, and 2- or 3-layer graphene when the oxidation time was from 48 to 72 hours.

The GO sheets contain oxygen proportion of approximately 35%-47% by weight for oxidation treatment times of 48-96 hours. GO sheets were suspended in water. Baking soda (5-20% by weight), as a chemical blowing agent, was added to the suspension just prior to casting. The GO suspension was then cast onto a glass surface using a doctor's blade to exert shear stresses, inducing GO sheet orientations. Several samples were cast, some containing a blowing agent and some not. The resulting GO films, after removal of liquid, have a thickness that can be varied from approximately 10 to 500 µm.

The several sheets of the GO film, with or without a blowing agent, were then subjected to heat treatments that involve an initial (first) thermal reduction temperature of 80-500° C. for 1-5 hours. This first heat treatment generated a graphene foam. However, the graphene domains in the foam wall can be further perfected (re-graphitized to become more ordered or having a higher degree of crystallinity and larger lateral dimensions of graphene planes, longer than the original graphene sheet dimensions due to chemical merging) if the foam is followed by heat-treating at a second temperature of 1,500-2,850° C.

In several samples, selenium particles were added into the GO suspension prior to the casting/coating procedure. When the solid graphene foam is formed, these particles are naturally embedded in the pores of the resulting foam. Typically, there is extra room between the Se particles and the pore walls due to the foaming process (e.g. room created by the volatile gas molecules that escape). This room is desirable in terms of enabling the foam to accommodate the volume expansion of Se particles (during Li—Se battery discharge) without generating excess volume increase of the cathode layer. Furthermore, the high elasticity or low compression set implies that the pore walls can snap back (shrink back) when the Se particles shrink (during the subsequent battery charge).

In several other samples, the solid graphene foam is formed first, which is then impregnated with Se via melt infusion or solution phase infiltration. The solid graphene foam produced in this manner typically is open-cell foam containing interconnected cells. However, the heat treatments can enable graphene sheet merging or chemical bonding with one another, resulting in a foamed structure that has adequate elasticity and conductivity.

Example 4: Preparation of Pristine Graphene Foam (0% Oxygen)

Recognizing the possibility of the high defect population in GO sheets acting to reduce the conductivity of individual graphene plane, we decided to study if the use of pristine graphene sheets (non-oxidized and oxygen-free, non-halogenated and halogen-free, etc.) can lead to a graphene foam having a higher thermal conductivity. Pristine graphene sheets were produced by using the direct ultrasonication or liquid-phase production process.

In a typical procedure, five grams of graphite flakes, ground to approximately 20 µm or less in sizes, were dispersed in 1,000 mL of deionized water (containing 0.1% by weight of a dispersing agent, Zonyl® FSO from DuPont) to obtain a suspension. An ultrasonic energy level of 85 W (Branson 5450 Ultrasonicator) was used for exfoliation, separation, and size reduction of graphene sheets for a period of 15 minutes to 2 hours. The resulting graphene sheets are pristine graphene that have never been oxidized and are oxygen-free and relatively defect-free. There are no other non-carbon elements.

Various amounts (1%-30% by weight relative to graphene material) of chemical bowing agents (N,N-dinitroso pentamethylene tetramine or 4,4'-oxybis (benzenesulfonyl hydrazide) were added to a suspension containing pristine graphene sheets and a surfactant. The suspension was then cast onto a glass surface using a doctor's blade to exert shear stresses, inducing graphene sheet orientations. Several samples were cast, including one that was made using $CO_2$ as a physical blowing agent introduced into the suspension just prior to casting). The resulting graphene films, after removal of liquid, have a thickness that can be varied from approximately 10 to 100 μm.

The graphene films were then subjected to heat treatments that involve an initial (first) thermal reduction temperature of 80-1,500° C. for 1-5 hours. This first heat treatment led to the production of a graphene foam. Some of the pristine foam samples were then subjected to a second temperature of 1,500-2,850° C. to determine if the graphene domains in the foam wall could be further perfected (re-graphitized to become more ordered or having a higher degree of crystallinity).

The solid graphene foam, without selenium impregnation, typically has a compression set (at 15% compression) of 15% or less and, in many cases, 8% or less. Many specimens have a compression set (at 50% compression) of 10% or less and, in many cases, 5% or less.

Again, selenium was introduced into the graphene pores in two ways: before coating/casting of graphene dispersion (added into the graphene suspension) and after graphene foam formation (subsequent infiltration of Se into pores of the foam structure).

Comparative Example 4-a: CVD Graphene Foams on Ni Foam Templates

The procedure was adapted from that disclosed in open literature: Chen, Z. et al. "Three-dimensional flexible and conductive interconnected graphene networks grown by chemical vapor deposition," Nat. Mater. 10, 424-428 (2011). Nickel foam, a porous structure with an interconnected 3D scaffold of nickel was chosen as a template for the growth of graphene foam. Briefly, carbon was introduced into a nickel foam by decomposing $CH_4$ at 1,000° C. under ambient pressure, and graphene films were then deposited on the surface of the nickel foam. Due to the difference in the thermal expansion coefficients between nickel and graphene, ripples and wrinkles were formed on the graphene films. In order to recover (separate) graphene foam, Ni frame must be etched away. Before etching away the nickel skeleton by a hot HCl (or $FeCl_3$) solution, a thin layer of poly(methyl methacrylate) (PMMA) was deposited on the surface of the graphene films as a support to prevent the graphene network from collapsing during nickel etching. After the PMMA layer was carefully removed by hot acetone, a fragile graphene foam sample was obtained. The use of the PMMA support layer is critical to preparing a free-standing film of graphene foam; only a severely distorted and deformed graphene foam sample was obtained without the PMMA support layer. This is a tedious process that is not environmentally benign and is not scalable.

Comparative Example 4-b: Conventional Graphitic Foam from Pitch-Based Carbon Foams Pitch powder, granules, or pellets are placed in a aluminum mold with the desired final shape of the foam. Mitsubishi ARA-24 mesophase pitch was utilized. The sample is evacuated to less than 1 torr and then heated to a temperature approximately 300° C. At this point, the vacuum was released to a nitrogen blanket and then a pressure of up to 1,000 psi was applied. The temperature of the system was then raised to 800° C. This was performed at a rate of 2 degree C./min. The temperature was held for at least 15 minutes to achieve a soak and then the furnace power was turned off and cooled to room temperature at a rate of approximately 1.5 degree C./min with release of pressure at a rate of approximately 2 psi/min. Final foam temperatures were 630° C. and 800° C. During the cooling cycle, pressure is released gradually to atmospheric conditions. The foam was then heat treated to 1050° C. (carbonized) under a nitrogen blanket and then heat treated in separate runs in a graphite crucible to 2500° C. and 2800° C. (graphitized) in Argon.

Samples from this conventional graphitic foam were machined into specimens for measuring the thermal conductivity. The bulk thermal conductivity of the graphitic foam was found to be in the range from 67 W/mK to 151 W/mK. The density of the samples was from 0.31 to 0.61 g/cm$^3$. When the material porosity level is taken into account, the specific thermal conductivity of the mesophase pitch derived foam is approximately 67/0.31=216 and 151/0.61=247.5 W/mK per specific gravity (or per physical density). In contrast, the specific thermal conductivity of the presently invented foam is typically >>250 W/mK per specific gravity.

The compression strength of the conventional graphitic foam samples having an average density of 0.51 g/cm$^3$ was measured to be 3.6 MPa and the compression modulus was measured to be 74 MPa. By contrast, the compression strength and compressive modulus of the presently invented graphene foam samples derived from GO having a comparable physical density are 5.7 MPa and 103 MPa, respectively.

Figure 5A:
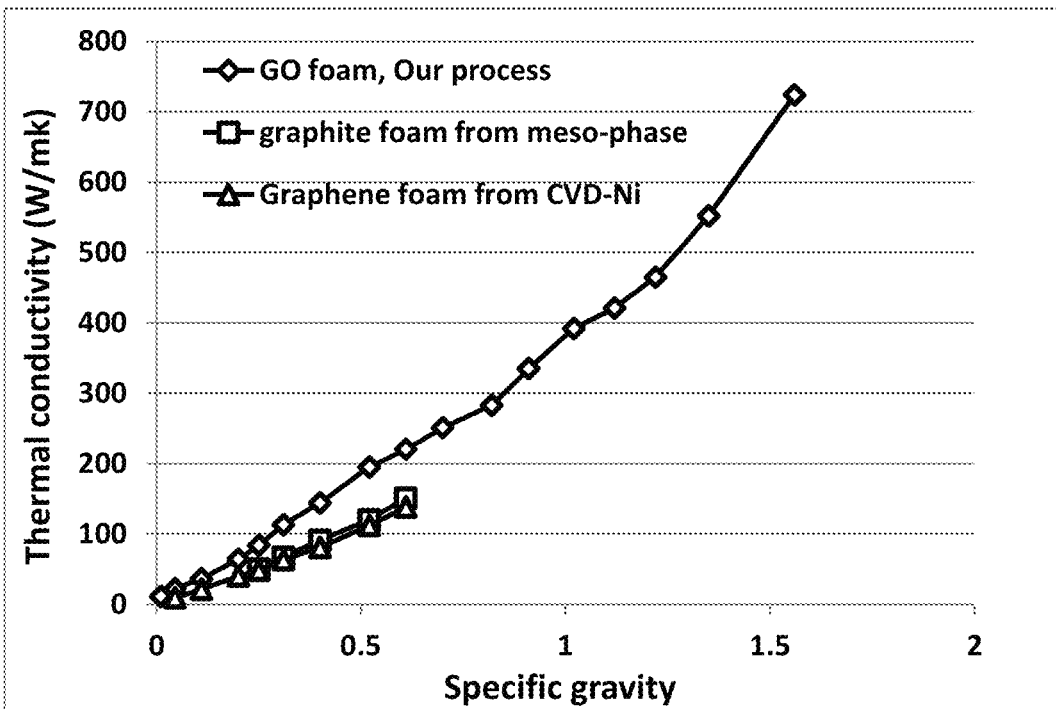
FIG. 5(A) Thermal conductivity values vs. specific gravity of the GO suspension-derived foam produced by the presently invented process, mesophase pitch-derived graphite foam, and Ni foam-template assisted CVD graphene foam.
Figure 6A:
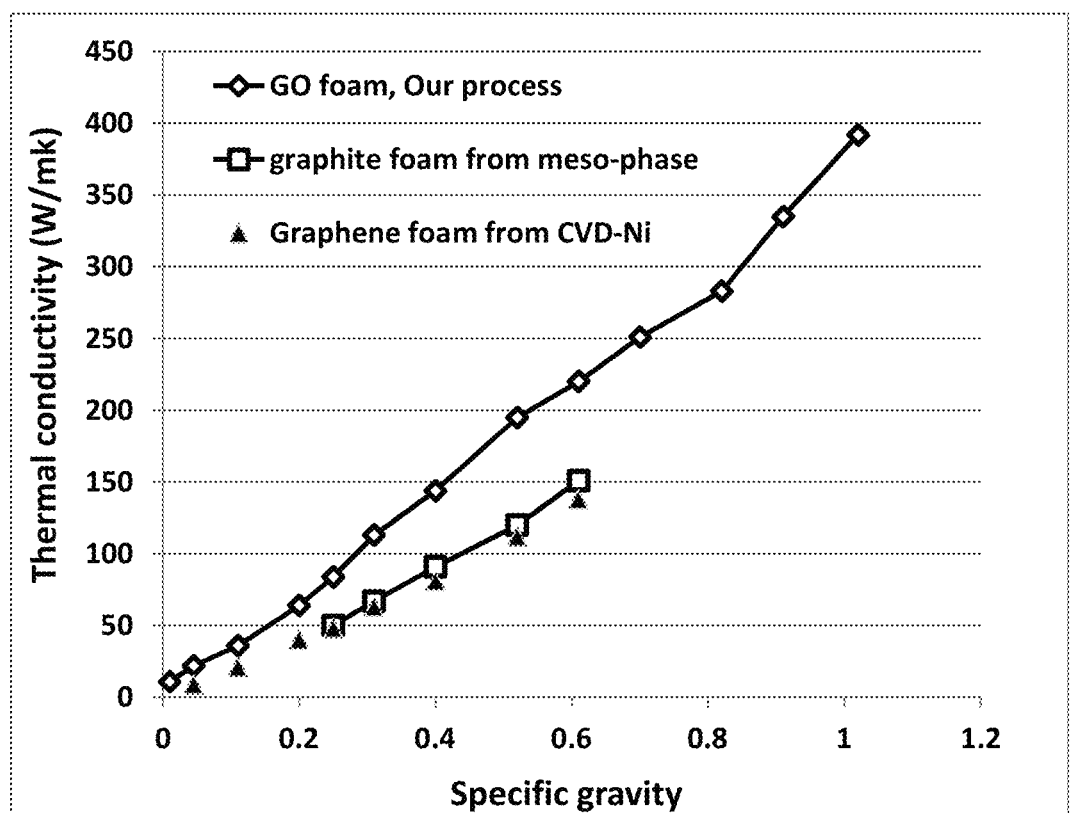
FIG. 6(A) Thermal conductivity values (vs. specific gravity values up to 1.02 g/cm$^3$) of the GO suspension-derived foam, mesophase pitch-derived graphite foam, and Ni foam-template assisted CVD graphene foam.

Shown in FIG. 5(A) and FIG. 6(A) are the thermal conductivity values vs. specific gravity of the GO suspension-derived foam (Example 3), mesophase pitch-derived graphite foam (Comparative Example 4-b), and Ni foam template-assisted CVD graphene foam (Comparative Example 4-a). These data clearly demonstrate the following unexpected results:

1) GO-derived graphene foams produced by the presently invented process exhibit significantly higher thermal conductivity as compared to both mesophase pitch-derived graphite foam and Ni foam template-assisted CVD graphene, given the same physical density.
2) This higher thermal conductivity is quite surprising in view of the notion that CVD graphene is essentially pristine graphene that has never been exposed to oxidation and should have exhibited a much higher thermal conductivity compared to graphene oxide (GO). GO is known to be highly defective (having a high defect population and, hence, low conductivity) even after the oxygen-containing functional groups are removed via conventional thermal or chemical reduction methods. These exceptionally high thermal conductivity values observed with the GO-derived graphene foams herein produced are much to our surprise. A good thermal dissipation capability is essential to the prevention of thermal run-away and explosion, a most serious problem associated with rechargeable lithium-ion batteries. A high electrical conductivity also makes it feasible for the solid graphene foam to serve as a cathode current collector (replacing Al foil or in addition to an Al foil), in addition to playing the role of protecting Se (e.g. preventing or reducing the out-migration of Se or lithium polyselenide).

3) FIG. 6(A) presents the thermal conductivity values over comparable ranges of specific gravity values to allow for calculation of specific conductivity (conductivity value, W/mK, divided by physical density value, g/cm$^3$) for all three graphitic foam materials based on the slopes of the curves (approximately straight lines at different segments). These specific conductivity values enable a fair comparison of thermal conductivity values of these three types of graphitic foams given the same amount of solid graphitic material in each type of foam. These data provide an index of the intrinsic conductivity of the solid portion of the foam material. These data clearly indicate that, given the same amount of solid material, the presently invented GO-derived foam is intrinsically most conducting, reflecting a high level of graphitic crystal perfection (larger crystal dimensions, fewer grain boundaries and other defects, better crystal orientation, etc.). This is also unexpected.

4) The specific conductivity values of the presently invented GO- and GF-derived foam exhibit values from 250 to 500 W/mK per unit of specific gravity; but those of the other two foam materials are typically lower than 250 W/mK per unit of specific gravity.

Figure 8:
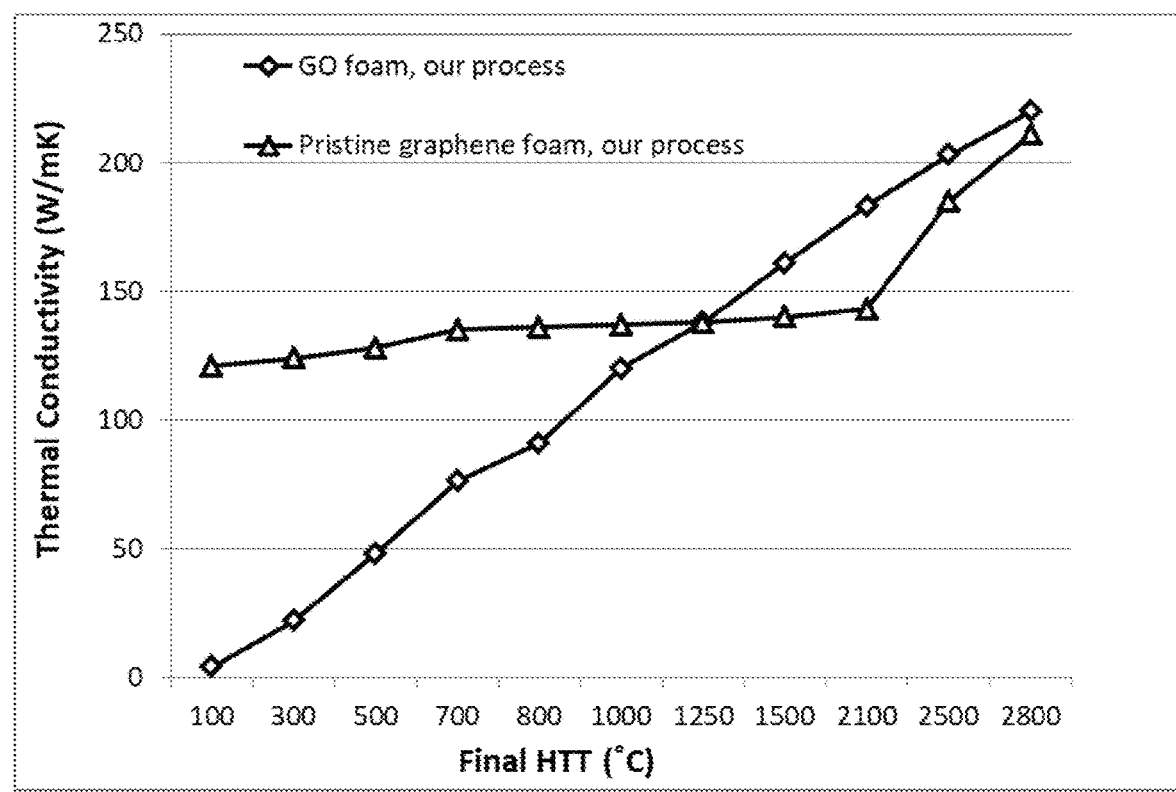
FIG. 8 Thermal conductivity values of graphene foam samples derived from GO and pristine graphene as a function of the final (maximum) heat treatment temperature.

Summarized in FIG. 8 are thermal conductivity data for a series of GO-derived graphene foams and a series of pristine graphene derived foams, both plotted over the final (maximum) heat treatment temperatures. These data indicate that the thermal conductivity of the GO foams is highly sensitive to the final heat treatment temperature (HTT). Even when the HTT is very low, clearly some type of graphene merging or crystal perfection reactions are already activated. The thermal conductivity increases monotonically with the final HTT. In contrast, the thermal conductivity of pristine graphene foams remains relatively constant until a final HTT of approximately 2,500° C. is reached, signaling the beginning of a re-crystallization and perfection of graphite crystals. There are no functional groups in pristine graphene, such as —COOH in GO, that enable chemical linking of graphene sheets at relatively low HTTs. With a HTT as low as 1,250° C., GO sheets can merge to form significantly larger graphene sheets with reduced grain boundaries and other defects. Even though GO sheets are intrinsically more defective than pristine graphene, the presently invented process enables the GO sheets to form graphene foams that outperform pristine graphene foams. This is another unexpected result.

Example 5: Preparation of Graphene Oxide (GO) Suspension from Natural Graphite and Preparation of Subsequent GO Foams Graphite oxide was prepared by oxidation of graphite flakes with an oxidizer liquid consisting of sulfuric acid, sodium nitrate, and potassium permanganate at a ratio of 4:1:0.05 at 30° C. When natural graphite flakes (particle sizes of 14 µm) were immersed and dispersed in the oxidizer mixture liquid for 48 hours, the suspension or slurry appears and remains optically opaque and dark. After 48 hours, the reacting mass was rinsed with water 3 times to adjust the pH value to at least 3.0. A final amount of water was then added to prepare a series of GO-water suspensions. We observed that GO sheets form a liquid crystal phase when GO sheets occupy a weight fraction >3% and typically from 5% to 15%.

By dispensing and coating the GO suspension on a polyethylene terephthalate (PET) film in a slurry coater and removing the liquid medium from the coated film we obtained a thin film of dried graphene oxide. Several GO film samples were then subjected to different heat treatments, which typically include a thermal reduction treatment at a first temperature of 100° C. to 500° C. for 1-10 hours, and at a second temperature of 1,500° C.-2,850° C. for 0.5-5 hours. With these heat treatments, also under a compressive stress, the GO films were transformed into graphene foam.

Comparative Example 5-a: Graphene Foams from Hydrothermally Reduced Graphene Oxide For comparison, a self-assembled graphene hydrogel (SGH) sample was prepared by a one-step hydrothermal method. In a typical procedure, the SGH can be easily prepared by heating 2 mg/mL of homogeneous graphene oxide (GO) aqueous dispersion sealed in a Teflon-lined autoclave at 180° C. for 12 h. The SGH containing about 2.6% (by weight) graphene sheets and 97.4% water has an electrical conductivity of approximately $5 \times 10^{-3}$ S/cm. Upon drying and heat treating at 1,500° C., the resulting graphene foam exhibits an electrical conductivity of approximately $1.5 \times 10^{-1}$ S/cm, which is 2 times lower than those of the presently invented graphene foams produced by heat treating at the same temperature.

Comparative Example 5-b: Plastic Bead Template-Assisted Formation of Reduced Graphene Oxide Foams A hard template-directed ordered assembly for a macro-porous bubbled graphene film (MGF) was prepared. Monodisperse poly methyl methacrylate (PMMA) latex spheres were used as the hard templates. The GO liquid crystal prepared in Example 5 was mixed with a PMMA spheres suspension. Subsequent vacuum filtration was then conducted to prepare the assembly of PMMA spheres and GO sheets, with GO sheets wrapped around the PMMA beads. A composite film was peeled off from the filter, air dried and calcinated at 800° C. to remove the PMMA template and thermally reduce GO into RGO simultaneously. The grey free-standing PMMA/GO film turned black after calcination, while the graphene film remained porous.

Figure 5B:
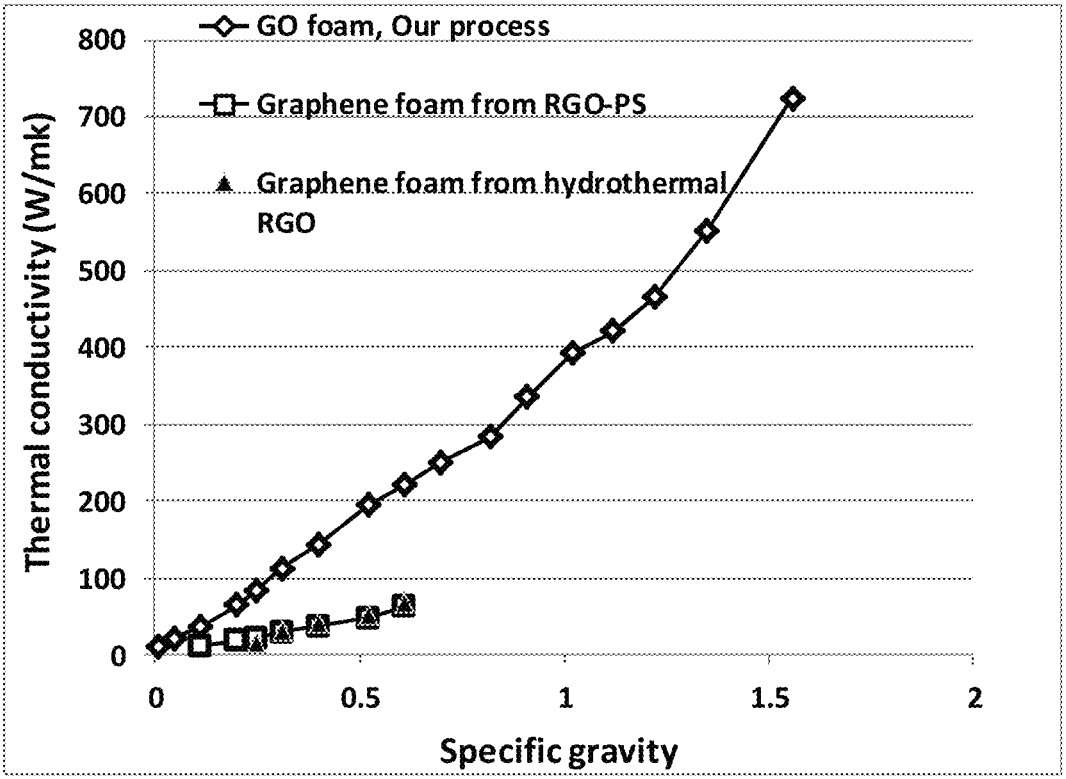
FIG. 5(B) Thermal conductivity values of the GO suspension-derived foam, sacrificial plastic bead-templated GO foam, and the hydrothermally reduced GO graphene foam.
Figure 5C:
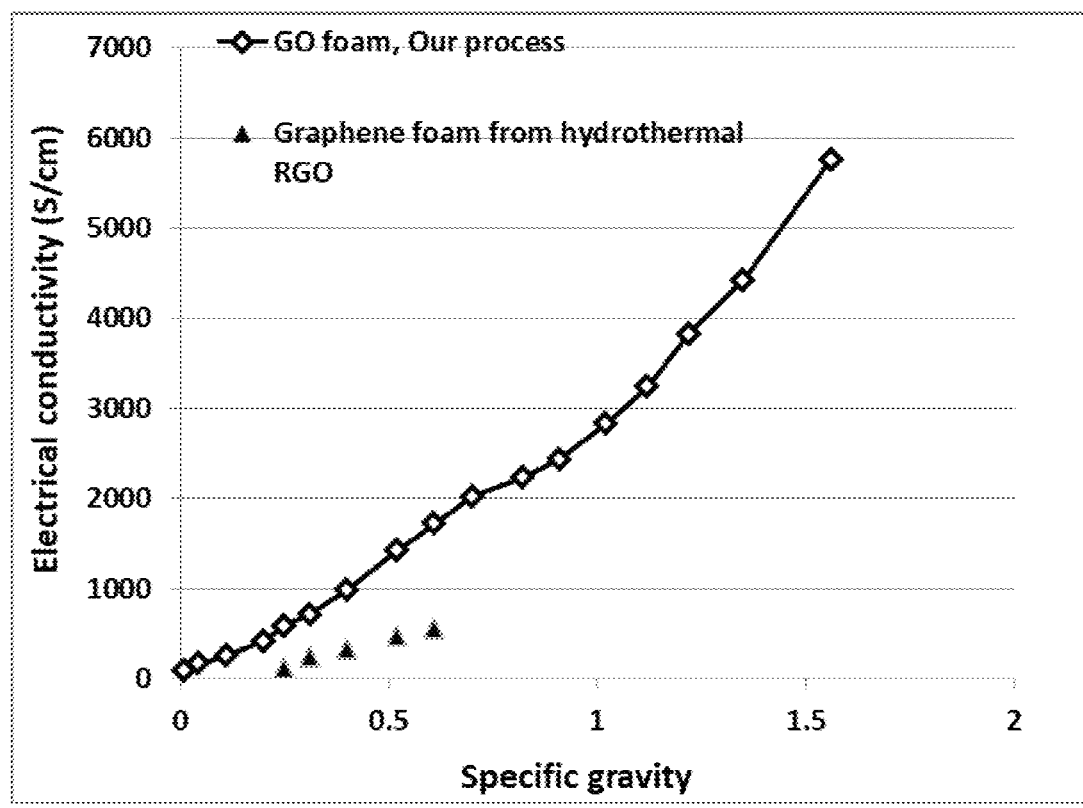
FIG. 5(C) Electrical conductivity data for the GO suspension-derived foam produced by the presently invented process and the hydrothermally reduced GO graphene foam.
Figure 6B:
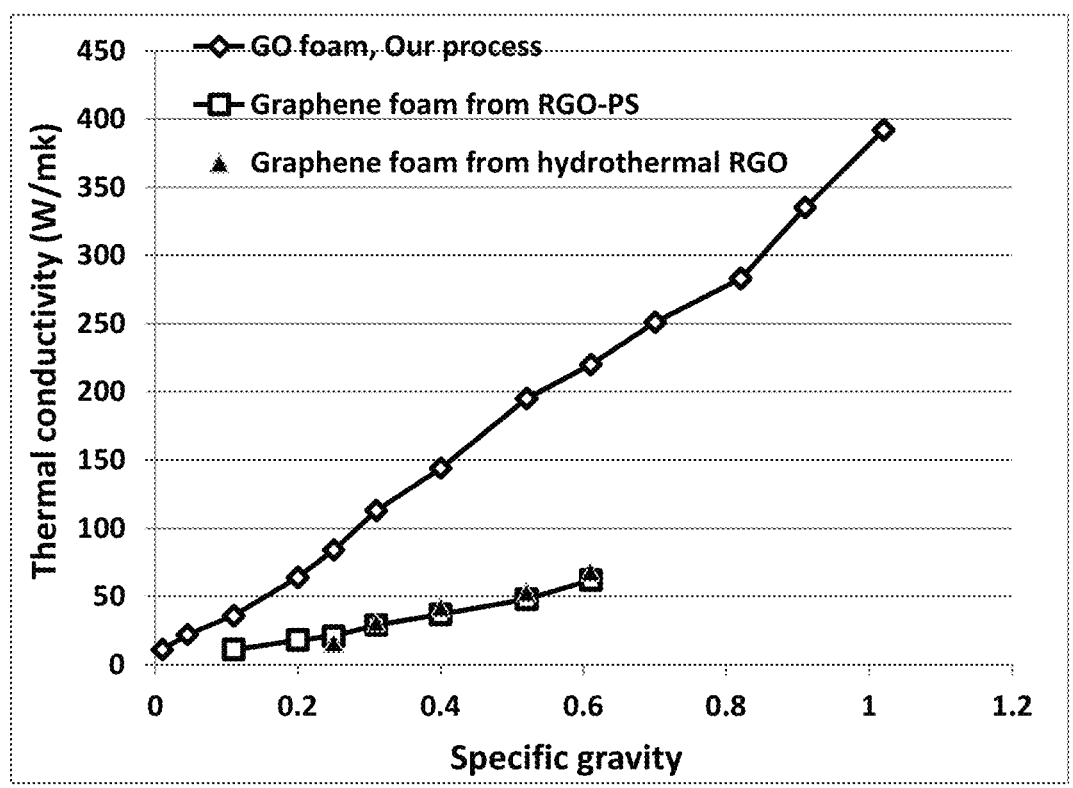
FIG. 6(B) Thermal conductivity values of the GO suspension-derived foam, sacrificial plastic bead-templated GO foam, and hydrothermally reduced GO graphene foam (vs. specific gravity values up to 1.02 g/cm³)

FIG. 5(B) and FIG. 6(B) show the thermal conductivity values of the presently invented GO suspension-derived foam, GO foam produced via sacrificial plastic bead template-assisted process, and hydrothermally reduced GO graphene foam. Most surprisingly, given the same starting GO sheets, the presently invented process produces the highest-performing graphene foams. Electrical conductivity data summarized in FIG. 4(C) are also consistent with this conclusion. These data further support the notion that, given the same amount of solid material, the presently invented GO suspension deposition (with stress-induced orientation) and subsequent heat treatments give rise to a graphene foam that is intrinsically most conducting, reflecting a highest level of graphitic crystal perfection (larger crystal dimensions, fewer grain boundaries and other defects, better crystal orientation, etc. along the pore walls).

It is of significance to point out that all the prior art processes for producing graphite foams or graphene foams appear to provide macro-porous foams having a physical density in the range from approximately 0.2-0.6 g/cm$^3$ only with pore sizes being typically too large (e.g. from 20 to 300 µm) for most of the intended applications. In contrast, the instant invention provides processes that generate graphene foams having a density that can be as low as 0.01 g/cm$^3$ and as high as 1.7 g/cm$^3$. The pore sizes can be varied between mesoscaled (2-50 nm) up to macro-scaled (1-500 μm) depending upon the contents of non-carbon elements and the amount/type of blowing agent used. This level of flexibility and versatility in designing various types of graphene foams is unprecedented and un-matched by any prior art process.

Example 6: Preparation of Graphene Foams from Graphene Fluoride

Several processes have been used by us to produce GF, but only one process is herein described as an example. In a typical procedure, highly exfoliated graphite (HEG) was prepared from intercalated compound $C_2F \cdot xClF_3$. HEG was further fluorinated by vapors of chlorine trifluoride to yield fluorinated highly exfoliated graphite (FHEG). Pre-cooled Teflon reactor was filled with 20-30 mL of liquid pre-cooled $ClF_3$, the reactor was closed and cooled to liquid nitrogen temperature. Then, no more than 1 g of HEG was put in a container with holes for $ClF_3$ gas to access and situated inside the reactor. In 7-10 days a gray-beige product with approximate formula $C_2F$ was formed.

Subsequently, a small amount of FHEG (approximately 0.5 mg) was mixed with 20-30 mL of an organic solvent (methanol, ethanol, 1-propanol, 2-propanol, 1-butanol, tert-butanol, isoamyl alcohol) and subjected to an ultrasound treatment (280 W) for 30 min, leading to the formation of homogeneous yellowish dispersions. Five minutes of sonication was enough to obtain a relatively homogenous dispersion, but longer sonication times ensured better stability. Upon casting on a glass surface with the solvent removed, the dispersion became a brownish film formed on the glass surface. When GF films were heat-treated, fluorine was released as gases that helped to generate pores in the film. In some samples, a physical blowing agent ($N_2$ gas) was injected into the wet GF film while being cast. These samples exhibit much higher pore volumes or lower foam densities. Without using a blowing agent, the resulting graphene fluoride foams exhibit physical densities from 0.35 to 1.38 g/cm$^3$. When a blowing agent was used (blowing agent/GF weight ratio from 0.5/1 to 0.05/1), a density from 0.02 to 0.35 g/cm$^3$ was obtained. Typical fluorine contents are from 0.001% (HTT=2,500° C.) to 4.7% (HTT=350° C.), depending upon the final heat treatment temperature involved.

Figure 7:
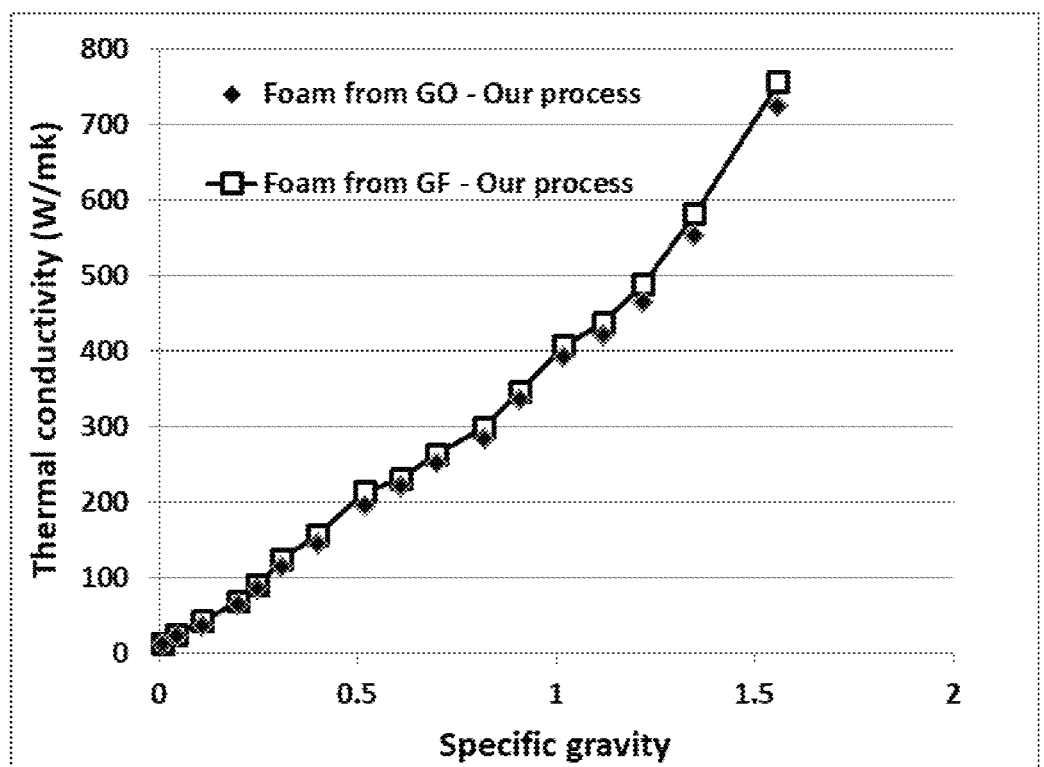
FIG. 7 Thermal conductivity values of graphene foam samples derived from GO and GF (graphene fluoride) as a function of the specific gravity.

FIG. 7 presents a comparison in thermal conductivity values of the graphene foam samples derived from GO and GF (graphene fluoride), respectively, as a function of the specific gravity. It appears that the GF foams, in comparison with GO foams, exhibit higher thermal conductivity values at comparable specific gravity values. Both deliver impressive heat-conducting capabilities, being the best among all known foamed materials.

This was followed by a heat treatment at 500° C. for 2 hours and Se melt infusion into pores of solid graphene foam to produce a graphene foam-protected Se cathode layer.

Again, selenium was introduced into the graphene pores in two ways: before coating/casting of graphene dispersion (added into the graphene suspension) and after graphene foam formation (subsequent infiltration of Se into pores of the foam structure).

Example 7: Preparation of Graphene Foams from Nitrogenated Graphene

Graphene oxide (GO), synthesized in Example 2, was finely ground with different proportions of urea and the pelletized mixture heated in a microwave reactor (900 W) for 30 s. The product was washed several times with deionized water and vacuum dried. In this method graphene oxide gets simultaneously reduced and doped with nitrogen. The products obtained with graphene:urea mass ratios of 1:0.5, 1:1 and 1:2 are designated as NGO-1, NGO-2 and NGO-3 respectively and the nitrogen contents of these samples were 14.7, 18.2 and 17.5 wt % respectively as found by elemental analysis. These nitrogenated graphene sheets remain dispersible in water. The resulting suspensions were then cast, dried, and heat-treated initially at 200-350° C. as a first heat treatment temperature and subsequently treated at a second temperature of 1,500° C. The resulting nitrogenated graphene foams exhibit physical densities from 0.45 to 1.28 g/cm$^3$. Typical nitrogen contents of the foams are from 0.01% (HTT=1,500° C.) to 5.3% (HTT=350° C.), depending upon the final heat treatment temperature involved.

Again, selenium was introduced into the graphene pores in two ways: before coating/casting of graphene dispersion (added into the graphene suspension) and after graphene foam formation (subsequent infiltration of Se into pores of the foam structure).

Example 8: Chemical Functionalization of Pristine Graphene Foam and Nitrogenated Graphene Foam Specimens of pristine graphene foam and nitrogenated graphene foam prepared earlier were subjected to functionalization by bringing these specimens in chemical contact with chemical compounds such as carboxylic acids, azide compound (2-azidoethanol), alkyl silane, diethylenetriamine (DETA), and chemical species containing hydroxyl group, carboxyl group, amine group, and sulfonate group ($-SO_3H$) in a liquid or solution form.

These chemical functionalization treatments generally result in faster and more uniform and complete infiltration of the pores with Sc using a solution deposition or chemical reaction-based deposition.

Example 9: Characterization of Various Graphene Foams and Conventional Graphite Foam The internal structures (crystal structure and orientation) of several dried GO layers, and the heat-treated films at different stages of heat treatments were investigated using X-ray diffraction. The X-ray diffraction curve of natural graphite typically exhibits a peak at approximately $2\theta=26°$, corresponds to an inter-graphene spacing ($d_{002}$) of approximately 0.3345 nm. Upon oxidation, the resulting GO shows an X-ray diffraction peak at approximately $2\theta=12°$, which corresponds to an inter-graphene spacing ($d_{002}$) of approximately 0.7 nm. With some heat treatment at 150° C., the dried GO compact exhibits the formation of a hump centered at 22°, indicating that it has begun the process of decreasing the inter-graphene spacing due to the beginning of chemical linking and ordering processes. With a heat treatment temperature of 2,500° C. for one hour, the $d_{002}$ spacing has decreased to approximately 0.336, close to 0.3354 nm of a graphite single crystal.

With a heat treatment temperature of 2,750° C. for one hour, the $d_{002}$ spacing is decreased to approximately to 0.3354 nm, identical to that of a graphite single crystal. In addition, a second diffraction peak with a high intensity appears at $2\theta=55°$ corresponding to X-ray diffraction from (004) plane. The (004) peak intensity relative to the (002) intensity on the same diffraction curve, or the I(004)/I(002) ratio, is a good indication of the degree of crystal perfection and preferred orientation of graphene planes. The (004) peak is either non-existing or relatively weak, with the I(004)/I(002) ratio <0.1, for all graphitic materials heat treated at a temperature lower than 2,800° C. The I(004)/I(002) ratio for the graphitic materials heat treated at 3,000-3,250° C. (e.g. highly oriented pyrolytic graphite, HOPG) is in the range from 0.2-0.5. In contrast, a graphene foam prepared with a final HTT of 2,750° C. for one hour exhibits a I(004)/I(002) ratio of 0.75 and a Mosaic spread value of 1.8, indicating a practically perfect graphene single crystal with a good degree of preferred orientation in the cell walls.

The "mosaic spread" value is obtained from the full width at half maximum of the (002) reflection in an X-ray diffraction intensity curve. This index for the degree of ordering characterizes the graphite or graphene crystal size (or grain size), amounts of grain boundaries and other defects, and the degree of preferred grain orientation. A nearly perfect single crystal of graphite is characterized by having a mosaic spread value of 0.2-0.4. Some of our graphene foams have a mosaic spread value in this range of 0.2-0.4 when produced using a final heat treatment temperature no less than 2,500° C.

Figure 9A:
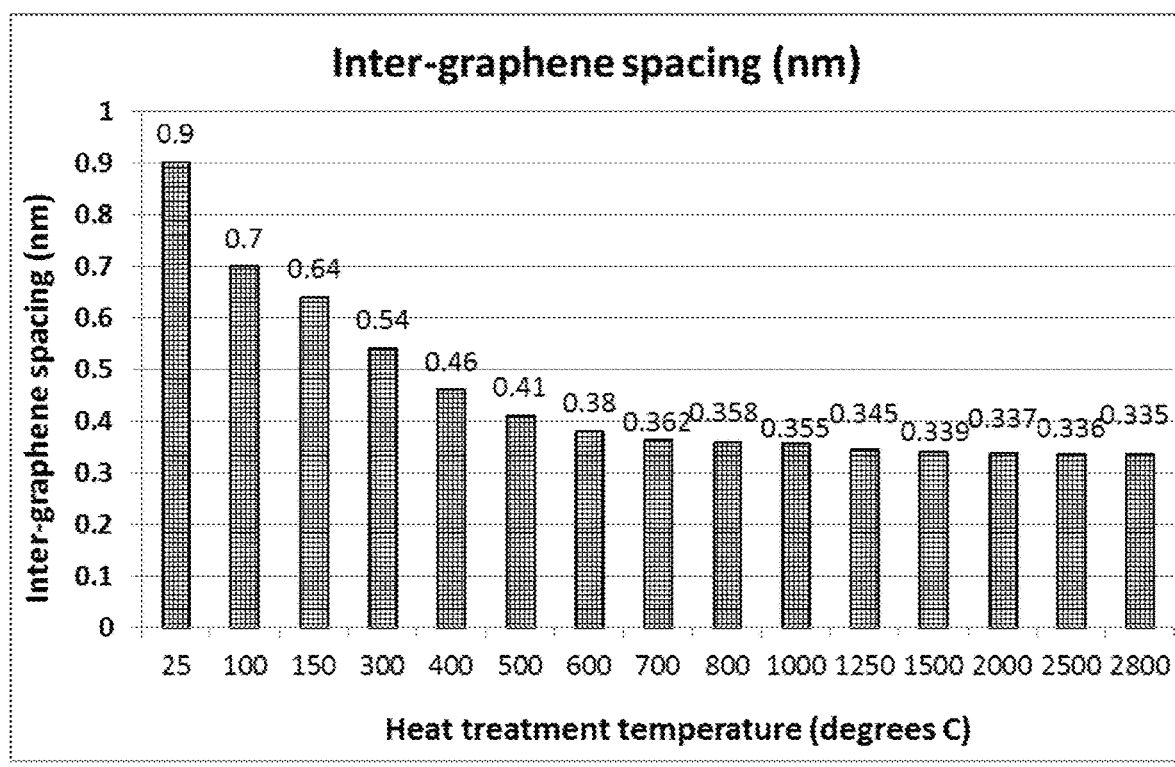
FIG. 9(A) Inter-graphene plane spacing in graphene foam walls as measured by X-ray diffraction.
Figure 9B:
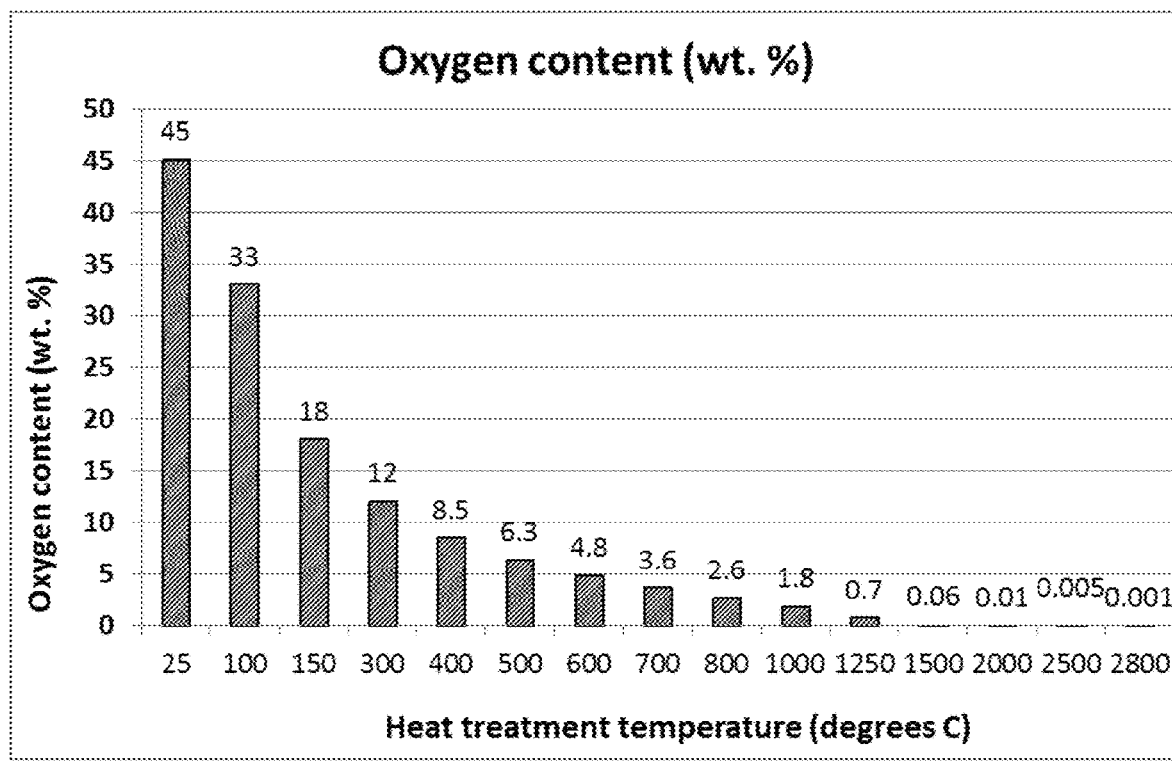
FIG. 9(B) The oxygen content in the GO suspension-derived graphene foam.

The inter-graphene spacing values of both the GO suspension-derived foam samples obtained by heat treating at various temperatures over a wide temperature range are summarized in FIG. 9(A). Corresponding oxygen content values in the GO suspension-derived graphene foam layer are shown in FIG. 9(B).

Figure 3:
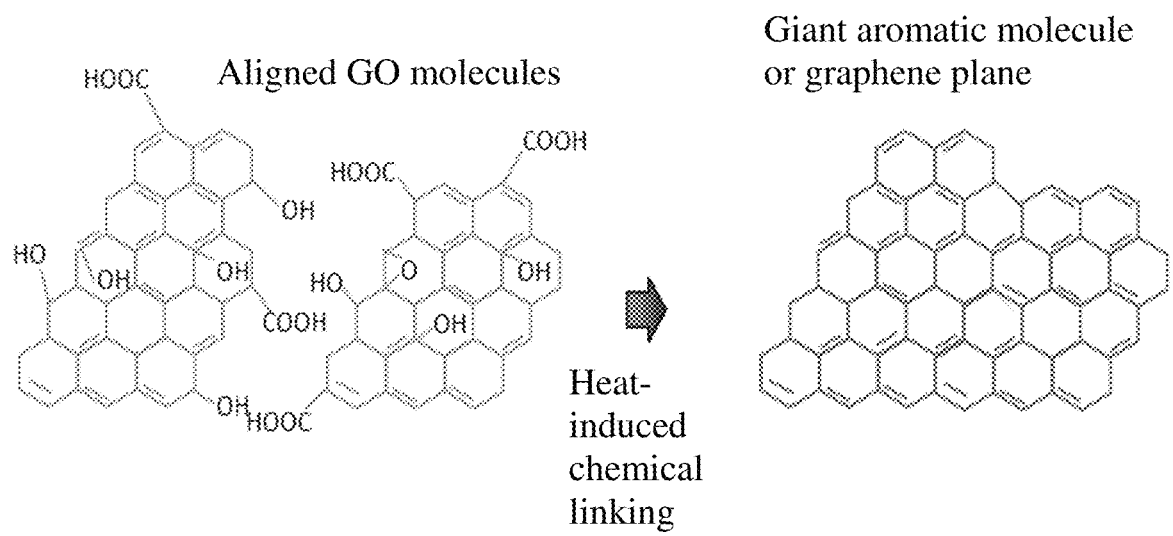
FIG. 3 A possible mechanism of chemical linking between graphene oxide sheets, which mechanism effectively increases the graphene sheet lateral dimensions.

It is of significance to point out that a heat treatment temperature as low as 500° C. is sufficient to bring the average inter-graphene spacing in GO sheets along the pore walls to below 0.4 nm, getting closer and closer to that of natural graphite or that of a graphite single crystal. The beauty of this approach is the notion that this GO suspension strategy has enabled us to re-organize, re-orient, and chemically merge the planar graphene oxide molecules from originally different graphite particles or graphene sheets into a unified structure with all the graphene planes in cell walls now being larger in lateral dimensions (significantly larger than the length and width of the graphene planes in the original graphite particles). A potential chemical linking mechanism is illustrated in FIG. 3. This has given rise to exceptional elasticity (low compression set), thermal conductivity and electrical conductivity values.

Figure 10:
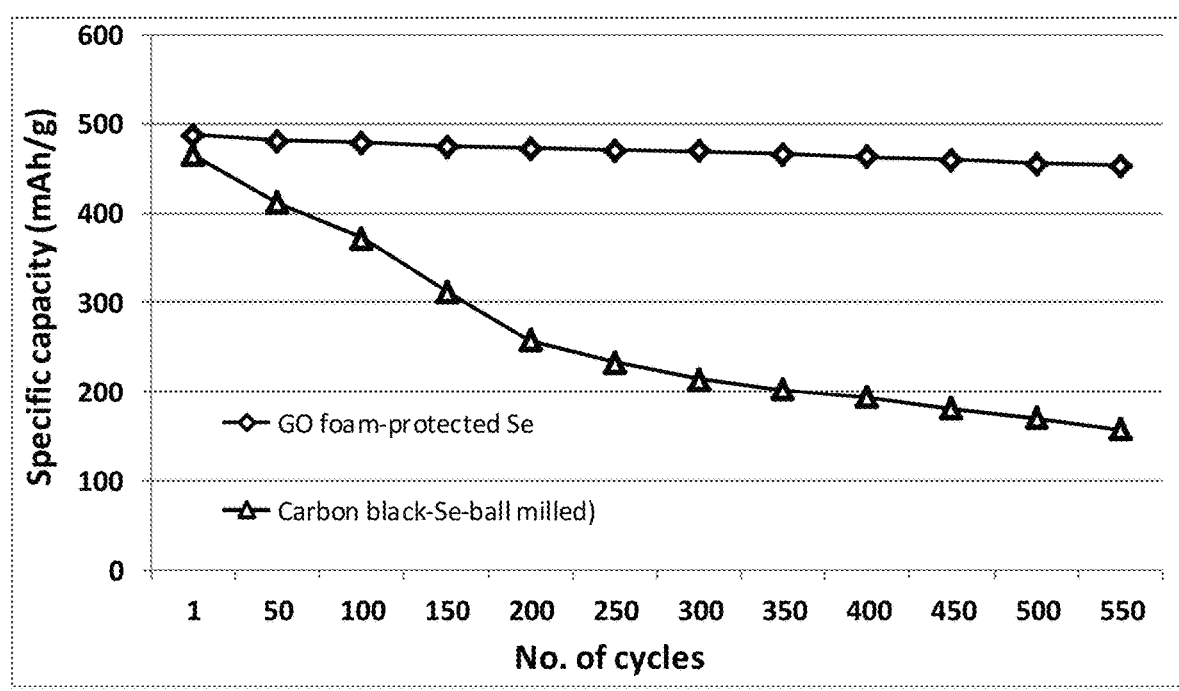
FIG. 10 The charge and discharge cycling results of two Li—Se cells, one containing a presently invented cathode structure of GO-derived graphene foam containing Se and the other containing a cathode prepared by ball-milling a mixture of Se powder and carbon black powder.

Several procedures were used to impregnate metal into the pores of solid graphene foam structures prepared according to the procedures described above. Impregnation or infiltration of graphene foam with Se, after foam formation, may be accomplished by a physical method (e.g. simple Se melt infusion, physical vapor deposition, and sputtering), chemical method (e.g. chemical vapor deposition, chemical reaction deposition, solution deposition, etc.), and electrochemical deposition Example 10: Electrochemical Behaviors of Li—Se, Na—Se, and K—Se Cells Shown in FIG. 10 are charge/discharge cycling responses of two Li—Se cells; one cell containing a presently invented cathode structure of GO-derived graphene foam containing Se residing in foam pores and the other cell containing a cathode prepared by ball-milling a mixture of Se powder and carbon black powder. Clearly, the presently invented cathode layer leads to a much stable cycling behavior given approximately the same Se amount in the cathode.

Figure 11:
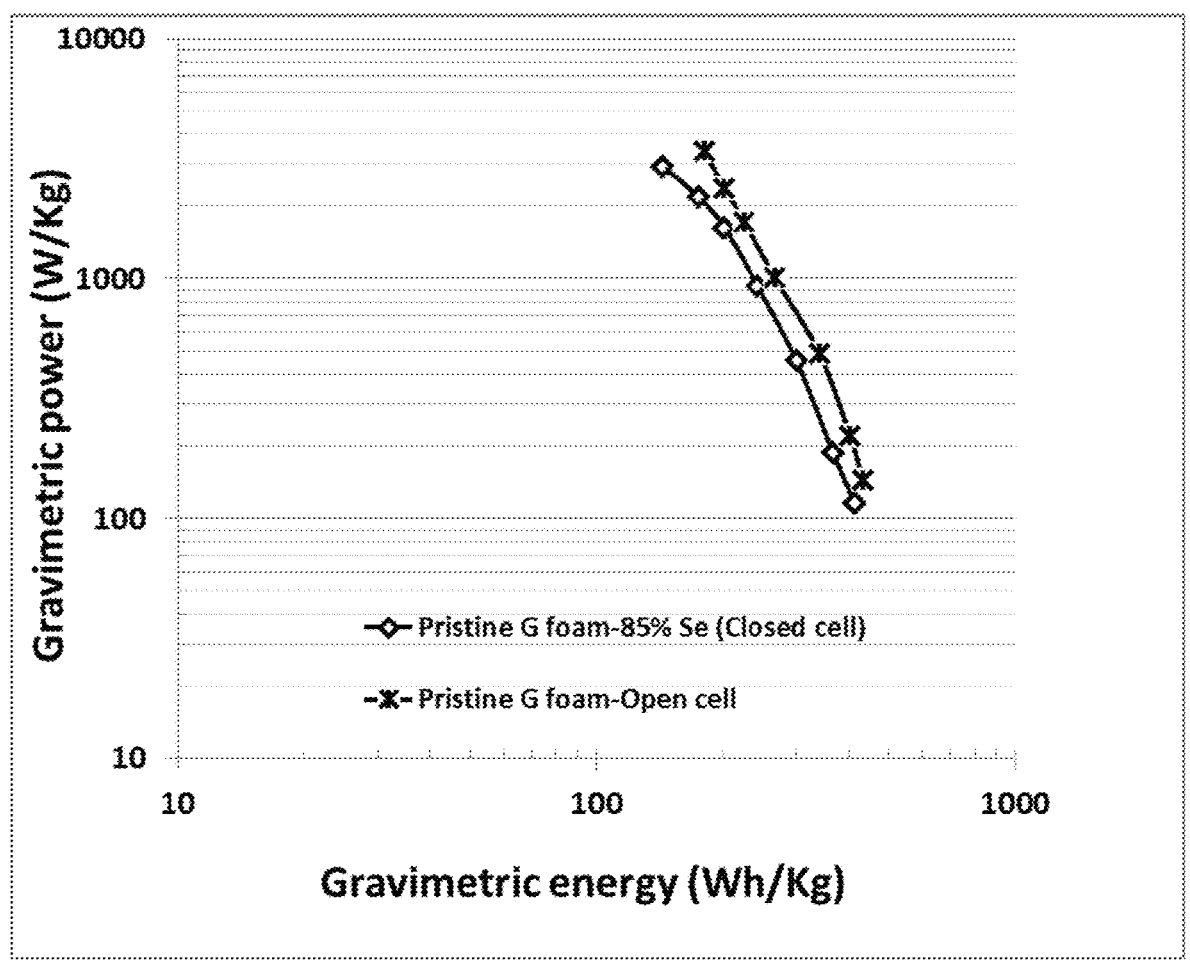
FIG. 11 Ragone plots (cell power density vs. cell energy density) of two Li metal-selenium cells each containing a pristine graphene foam cathode containing Se in the foam pores. One cell contains closed-cell graphene foam prepared by adding Se particles in the graphene suspension prior to coating and heat treatments. The other cell contains open-cell graphene foam containing Se that is melt-infiltrated into foam pores after the formation of the graphene foam.

FIG. 11 shows the Ragone plots (cell power density vs. cell energy density) of two Li metal-selenium cells, each containing a pristine graphene foam cathode containing Se in the foam pores. One cell contains closed-cell graphene foam prepared by adding Se particles in the graphene suspension prior to coating and heat treatments for the graphene foam formation. The other cell contains open-cell graphene foam containing Se that is melt-infiltrated into foam pores after the formation of the graphene foam. The cell that contains an open-cell foam-based cathode exhibits consistently higher energy density and power density values as compared to the cell containing a closed-cell foam-based cathode. However, in general, the closed-cell foam leads to a more stable charge/discharge cycling behavior, capable of maintaining good capacity over a larger number of cycles. Both types of batteries are capable of delivering a high energy density (e.g. as high as 433 Wh/kg, much higher than those of conventional lithium-ion batteries) and a high power density (e.g. as high as 3,354 W/kg).

Figure 12:
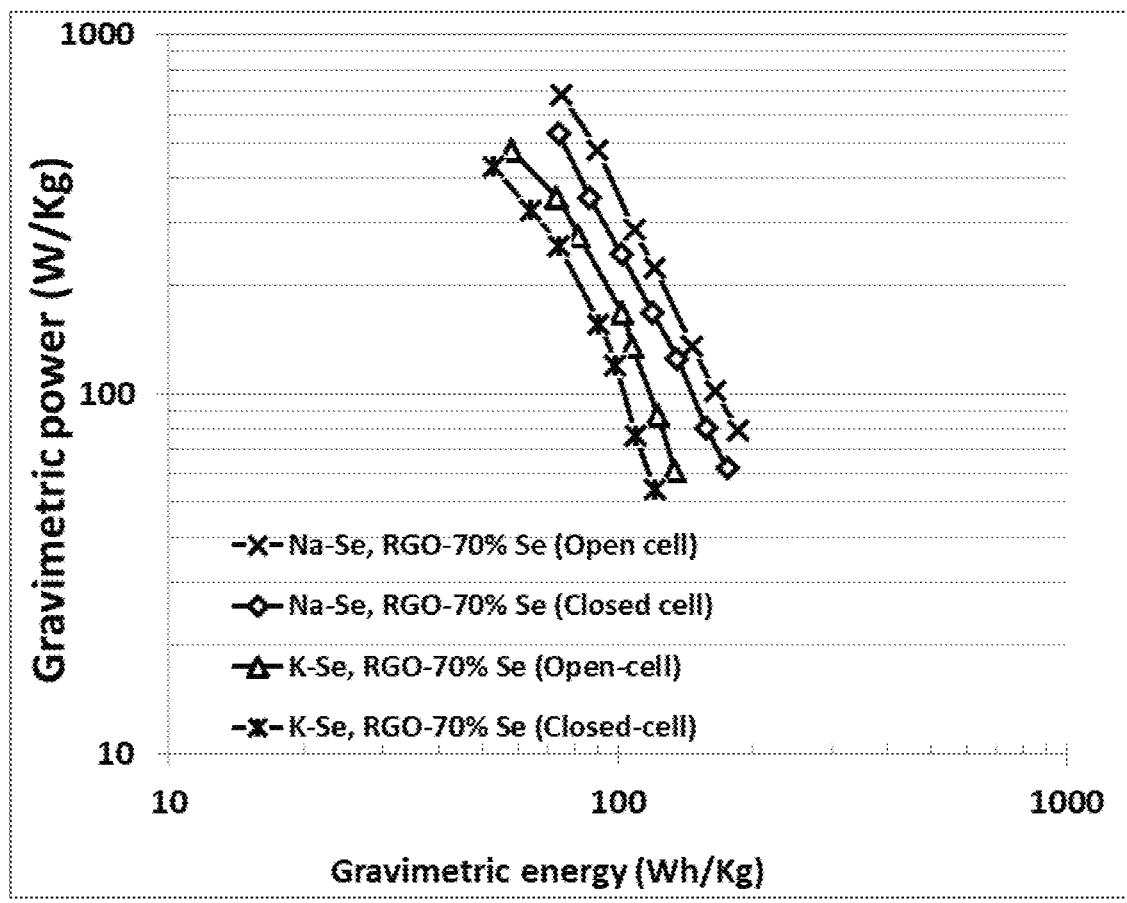
FIG. 12 Ragone plots (cell power density vs. cell energy density) of 4 alkali metal-selenium cells: a Na—Se cell featuring an open-cell RGO foam-based cathode containing electrochemically deposited selenium particles (70% Se), a Na—Se cell featuring a closed-cell RGO foam-based cathode containing Se particles (70% Se), a K—Se cell featuring an open-cell RGO foam-based cathode containing electrochemically deposited Se particles (70% Se), and a K—Se cell featuring a closed-cell RGO foam-based cathode containing Se particles (70% Se) added into the graphene solution prior to coating, drying and foam formation.

FIG. 12 shows the Ragone plots (cell power density vs. cell energy density) of 4 alkali metal-selenium cells: a Na—Se cell featuring an open-cell RGO foam-based cathode containing electrochemically deposited selenium coating (70% Se), a Na—Se cell featuring a closed-cell RGO foam-based cathode containing Se particles (70% Se), a K—Se cell featuring an open-cell RGO foam-based cathode containing electrochemically deposited Se coating (70% Se), and a K—Se cell featuring a closed-cell RGO foam-based cathode containing Se particles (70% Se) added into the graphene solution prior to coating, drying and foam formation. Again, for both the Na—Se and K—Se batteries, the cell that contains an open-cell foam-based cathode exhibits a consistently higher energy density and power density as compared to the cell containing a closed-cell foam-based cathode.

We claim:

1. A graphene foam-protected selenium cathode layer for an alkali metal-selenium cell, comprising:
    (a) a sheet or a roll of solid graphene foam composed of multiple pores or cells and pore walls containing graphene sheets, wherein said graphene sheets contain a pristine graphene material having less than 0.01% by weight of non-carbon elements or a non-pristine graphene material having 0.01% to 20% by weight of non-carbon elements, wherein said non-pristine graphene is selected from graphene oxide, reduced graphene oxide, graphene fluoride, graphene chloride, graphene bromide, graphene iodide, hydrogenated graphene, nitrogenated graphene, boron-doped graphene, nitrogen-doped graphene, chemically functionalized graphene, or a combination thereof, wherein said graphene sheets are interconnected or chemically merged together without an adhesive resin; and
    (b) selenium coating or particles residing in said pores or bonded to said pore walls of said solid graphene foam, wherein said solid graphene foam further accommodates a second element selected from Bi and the weight of said second element is less than the weight of selenium.

2. The graphene foam-protected selenium cathode layer of claim 1, wherein said solid graphene foam contains a three-dimensional network of interconnected open cells.

3. The graphene foam-protected selenium cathode layer of claim 1, wherein said solid graphene foam contains closed cells.

4. The graphene foam-protected selenium cathode layer of claim 1, wherein said solid graphene foam, when measured without said selenium, has a density ranging from about 0.001 g/cm$^3$ to about 1.5 g/cm$^3$.

5. The graphene foam-protected selenium cathode layer of claim 1, wherein said selenium occupies a weight fraction of 40%-95% based on the total weight of the solid graphene foam and selenium combined.

6. The graphene foam-protected selenium cathode layer of claim 1, wherein said selenium coating or particles have a thickness or diameter from 0.5 nm to 100 nm.

7. The graphene foam-protected selenium cathode layer of claim 1, having a thickness from 100 nm to 2 mm.

8. The graphene foam-protected selenium cathode layer of claim 1, having a thickness from 10 μm to 500 μm.

9. The graphene foam-protected selenium cathode layer of claim 1, wherein said solid graphene foam further contains a carbon or graphite filler selected from a carbon or graphite fiber, carbon or graphite nanofiber, carbon nanotube, carbon nanorod, mesophase carbon particle, mesocarbon microbead, expanded graphite flake, needle coke, carbon black or acetylene black, activated carbon, or a combination thereof.

10. The graphene foam-protected selenium cathode layer of claim 1, wherein said chemically functionalized graphene contains a functional group attached thereto to make the graphene sheets in a liquid medium exhibit a negative Zeta potential from −55 mV to −0.1 mV.

11. The graphene foam-protected selenium cathode layer of claim 1, wherein said chemically functionalized graphene comprises graphene sheets having a chemical functional group selected from alkyl or aryl silane, alkyl or aralkyl group, hydroxyl group, carboxyl group, carboxylic group, amine group, sulfonate group (—SO$_3$H), aldehydic group, quinoidal, fluorocarbon, or a combination thereof.

12. The graphene foam-protected selenium cathode layer of claim 1, wherein said chemically functionalized graphene comprises graphene sheets having a chemical functional group selected from a derivative of a compound selected from the group consisting of 2-azidoethanol, 3-azidopropan-1-amine, 4-(2-azidoethoxy)-4-oxobutanoic acid, 2-azido-ethyl-2-bromo-2-methylpropanoate, chlorocarbonate, azidocarbonate, dichlorocarbene, carbene, aryne, nitrene, (R-)-oxycarbonyl nitrenes, where R=any one of the following groups,

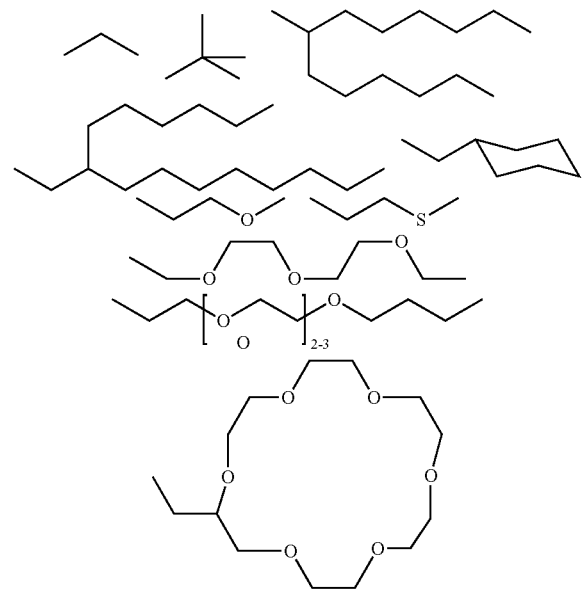

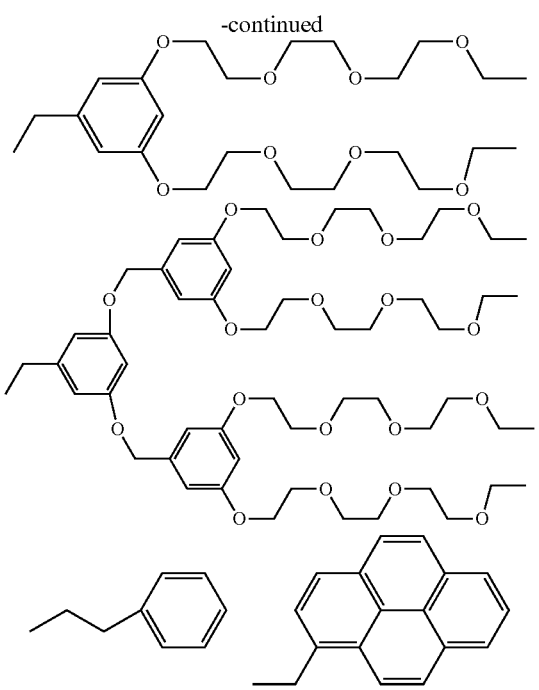

and combinations thereof.

13. The graphene foam-protected selenium cathode layer of claim 1, wherein said chemically functionalized graphene comprises graphene sheets having a chemical functional group selected from an oxygenated group selected from the group consisting of hydroxyl, peroxide, ether, keto, and aldehyde.

14. The graphene foam-protected selenium cathode layer of claim 1, wherein said chemically functionalized graphene comprises graphene sheets having a chemical functional group selected from the group consisting of —SO$_3$H, —COOH, —NH$_2$, —OH, —R'CHOH, —CHO, —CN, —COCl, halide, —COSH, —SH, —COOR', —SR', —SiR'3, —Si(—OR'—)$_y$R'3-y, —Si(—O—SiR'$_2$—)OR', —R", Li, AlR'$_2$, Hg—X, TlZ$_2$ and Mg—X; wherein y is an integer equal to or less than 3, R' is hydrogen, alkyl, aryl, cycloalkyl, or aralkyl, cycloaryl, or poly(alkylether), R" is fluoroalkyl, fluoroaryl, fluorocycloalkyl, fluoroaralkyl or cycloaryl, X is halide, and Z is carboxylate or trifluoroacetate, and combinations thereof.

15. The graphene foam-protected selenium cathode layer of claim 1, wherein said chemically functionalized graphene comprises graphene sheets having a chemical functional group selected from the group consisting of amidoamines, polyamides, aliphatic amines, modified aliphatic amines, cycloaliphatic amines, aromatic amines, anhydrides, ketimines, diethylenetriamine (DETA), triethylene-tetramine (TETA), tetraethylene-pentamine (TEPA), polyethylene polyamine, polyamine epoxy adduct, phenolic hardener, non-brominated curing agent, non-amine curatives, and combinations thereof.

16. The graphene foam-protected selenium cathode layer of claim 1, wherein said chemically functionalized graphene comprises graphene sheets having a chemical functional group selected from OY, NHY, O=C—OY, P=C—NR'Y, O=C—SY, O=C—Y, —CR'1—OY, N'Y or C'Y, and Y is a functional group of a protein, a peptide, an amino acid, an enzyme, an antibody, a nucleotide, an oligonucleotide, an antigen, or an enzyme substrate, enzyme inhibitor or the transition state analog of an enzyme substrate or is selected from R'—OH, R'—NR'$_2$, R'SH, R'CHO, R'CN, R'X, R'N$^+$(R')$_3$X$^-$, R'SiR'$_3$, R'Si(—OR'—)$_y$R'$_{3-y}$, R'Si(—O—SiR'$_2$—)OR', R'—R", R'—N═CO, (C$_2$H$_4$O—)$_w$H, (—C$_3$H$_6$O—)$_w$H, (—C$_2$H$_4$O)$_w$—R', (C$_3$H$_6$O)$_w$—R', R', and w is an integer greater than one and less than 200.

17. An alkali metal-selenium battery containing an anode, a cathode, an electrolyte in ionic contact with the cathode and the anode, wherein the cathode comprises the graphene foam-protected selenium cathode layer of claim 1.

18. The alkali metal-selenium battery of claim 17, wherein said solid graphene foam serves as a cathode current collector and there is no additional separate cathode current collector supporting said solid graphene foam.

19. The alkali metal-selenium battery of claim 17, further comprising an anode current collector and/or an additional separate cathode current collector.

20. The alkali metal-selenium battery of claim 17, which is selected from a rechargeable lithium-selenium cell, sodium-selenium cell, potassium-selenium cell, lithium ion-selenium cell, sodium ion-selenium cell, or potassium ion-selenium cell.

21. The alkali metal-selenium battery of claim 17 wherein said electrolyte is selected from polymer electrolyte, polymer gel electrolyte, composite electrolyte, ionic liquid electrolyte, non-aqueous liquid electrolyte, soft matter phase electrolyte, solid-state electrolyte, or a combination thereof.

22. The alkali metal-selenium battery of claim 17, wherein said electrolyte contains an alkali salt selected from lithium perchlorate (LiClO$_4$), lithium hexafluorophosphate (LiPF$_6$), lithium borofluoride (LiBF$_4$), lithium hexafluoroarsenide (LiAsF$_6$), lithium trifluoro-metasulfonate (LiCF$_3$SO$_3$), bis-trifluoromethyl sulfonylimide lithium (LiN(CF$_3$SO$_2$)$_2$, Lithium bis(oxalato)borate (LiBOB), lithium oxalyldifluoroborate (LiBF$_2$C$_2$O$_4$), lithium nitrate (LiNO$_3$), Li-fluoroalkyl-phosphates (LiPF$_3$(CF$_2$CF$_3$)$_3$), lithium bis-perfluoroethysulfonylimide (LiBETI), an ionic liquid salt, sodium perchlorate (NaClO$_4$), potassium perchlorate (KClO$_4$), sodium hexafluorophosphate (NaPF$_6$), potassium hexafluorophosphate (KPF$_6$), sodium borofluoride (NaBF$_4$), potassium borofluoride (KBF$_4$), sodium hexafluoroarsenide, potassium hexafluoroarsenide, sodium trifluoro-metasulfonate (NaCF$_3$SO$_3$), potassium trifluoro-metasulfonate (KCF$_3$SO$_3$), bis-trifluoromethyl sulfonylimide sodium (NaN(CF$_3$SO$_2$)$_2$), sodium trifluoromethanesulfonimide (NaTFSI), bis-trifluoromethyl sulfonylimide potassium (KN(CF$_3$SO$_2$)$_2$), or a combination thereof.

23. The alkali metal-selenium battery of claim 17, wherein said solvent is selected from ethylene carbonate (EC), dimethyl carbonate (DMC), methylethyl carbonate (MEC), diethyl carbonate (DEC), ethyl propionate, methyl propionate, propylene carbonate (PC), gamma-butyrolactone (γ-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, room temperature ionic liquid, or a combination thereof.

* * * * *